US010360933B2

(12) United States Patent
Biskeborn et al.

(10) Patent No.: US 10,360,933 B2
(45) **Date of Patent: *Jul. 23, 2019**

(54) HYBRID DIELECTRIC GAP LINER AND MAGNETIC SHIELD LINER

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,022

(22) Filed: Apr. 25, 2018

(65) Prior Publication Data

US 2018/0277148 A1 Sep. 27, 2018

Related U.S. Application Data

(63) Continuation of application No. 15/466,540, filed on Mar. 22, 2017, now Pat. No. 9,997,180.

(51) Int. Cl.

*G11B 5/39* (2006.01)
*G11B 5/11* (2006.01)
(Continued)

(52) U.S. Cl.

CPC .......... *G11B 5/3912* (2013.01); *G11B 5/3106* (2013.01); *G11B 5/398* (2013.01); *G11B 5/3909* (2013.01); *G11B 5/00813* (2013.01)

(58) Field of Classification Search

None
See application file for complete search history.

(56) References Cited

U.S. PATENT DOCUMENTS 4,610,935 A 9/1986 Kumasaka et al.
5,668,686 A 9/1997 Shouji et al.
(Continued)

FOREIGN PATENT DOCUMENTS

EP 0911811 A2 4/1999
EP 2320489 A1 5/2011
JP 2006134388 A 5/2006

OTHER PUBLICATIONS

Biskeborn et al., U.S. Appl. No. 14/752,931, filed Jun. 27, 2015.
(Continued)

*Primary Examiner* — Craig A. Renner
(74) *Attorney, Agent, or Firm* — Zilka-Kotab, P.C.

(57) ABSTRACT

In one embodiment, an apparatus includes a transducer structure having a lower shield and an upper shield, the upper and lower shields providing magnetic shielding. A current-perpendicular-to-plane sensor is positioned between the upper and lower shields. An electrical lead layer is positioned between the sensor and one of the shields. The electrical lead layer is in electrical communication with the sensor. A resistance of the electrical lead layer along a direction orthogonal to a media facing surface is less than a resistance across the sensor along a direction parallel to the media facing surface. A spacer layer is positioned between the electrical lead layer and the one of the shields. One or both of the shields has at least one laminate pair comprising a magnetically permeable layer and a harder layer, the harder layer having a mechanical hardness that is higher than a mechanical hardness of the magnetically permeable layer.

19 Claims, 19 Drawing Sheets

(51) Int. Cl.
*G11B 5/31* (2006.01)
*G11B 5/008* (2006.01)

(56) References Cited

U.S. PATENT DOCUMENTS 5,668,688 A 9/1997 Dykes et al.
5,838,521 A 11/1998 Ravipati
5,862,022 A 1/1999 Noguchi et al.
5,880,910 A 3/1999 Shouji et al.
5,898,547 A 4/1999 Fontana, Jr. et al.
5,898,548 A 4/1999 Dill et al.
5,963,401 A 10/1999 Dee et al.
6,185,080 B1 2/2001 Gill
6,198,609 B1 3/2001 Barr et al.
6,209,193 B1 4/2001 Hsiao
6,292,334 B1 9/2001 Koike et al.
6,353,518 B2 3/2002 Pinarbasi
6,425,989 B1 7/2002 Westwood
6,680,832 B2 1/2004 Fontana, Jr. et al.
6,729,014 B2 5/2004 Lin et al.
6,735,059 B2 5/2004 Sato
6,760,198 B2 7/2004 Jarratt
6,762,912 B2 7/2004 Ma
6,833,979 B1 12/2004 Knapp et al.
6,847,509 B2 1/2005 Yoshikawa et al.
6,980,403 B2 12/2005 Hasegawa
7,031,119 B2 4/2006 Watanabe et al.
7,057,864 B2 6/2006 Gill
7,280,321 B2 10/2007 Watanabe et al.
7,352,539 B2 4/2008 Sato et al.
7,382,589 B2 6/2008 Lin et al.
7,551,409 B2 6/2009 Carey et al.
7,715,156 B2 5/2010 Hirata et al.
7,933,100 B2 4/2011 Nakabayashi et al.
8,081,398 B2 12/2011 Hachisuka
8,335,056 B2 12/2012 Balamane et al.
8,470,463 B2 6/2013 Wessel et al.
8,514,526 B2 8/2013 Ito et al.
8,531,801 B1 9/2013 Xiao et al.
8,576,518 B1 11/2013 Zeltser et al.
8,638,530 B1 1/2014 Hsu et al.
8,760,819 B1 6/2014 Liu et al.
8,780,505 B1 7/2014 Xiao
8,797,692 B1 8/2014 Guo et al.
8,804,287 B2 8/2014 Araki et al.
8,830,635 B2 9/2014 Watanabe et al.
8,873,204 B1 10/2014 Gao et al.
8,891,207 B1 11/2014 Li et al.
8,908,333 B1 12/2014 Rudy et al.
8,941,954 B2 1/2015 Le et al.
9,013,836 B1 4/2015 Liu et al.
9,111,550 B1 8/2015 Liu et al.
9,263,068 B1 2/2016 Biskeborn et al.
9,280,991 B1 3/2016 Biskeborn et al.
9,384,764 B1 7/2016 Biskeborn et al.
9,406,319 B1 8/2016 Biskeborn et al.
9,607,635 B1 3/2017 Biskeborn et al.
9,997,180 B1 6/2018 Biskeborn et al.
2002/0064002 A1 5/2002 Gill
2002/0154458 A1 10/2002 Lin et al.
2002/0186514 A1 12/2002 Childress et al.
2003/0011944 A1 1/2003 Hosomi
2004/0057162 A1 3/2004 Gill
2004/0218313 A1 11/2004 Suda
2007/0047146 A1 3/2007 Biskeborn et al.
2007/0195467 A1 8/2007 Gill
2007/0230062 A1 10/2007 Maejima et al.
2008/0117553 A1 5/2008 Carey et al.
2008/0151438 A1 6/2008 Tanaka et al.
2008/0170335 A1 7/2008 Iben et al.
2009/0040661 A1 2/2009 Tanaka et al.
2010/0103563 A1 4/2010 Machita et al.
2011/0019313 A1 1/2011 Brown et al.
2011/0026168 A1 2/2011 Carey et al.
2011/0051291 A1 3/2011 Miyauchi et al.
2011/0069417 A1 3/2011 Kawamori et al.
2011/0085261 A1 4/2011 Ito et al.
2012/0050919 A1 3/2012 Brown et al.
2012/0063034 A1 3/2012 Hsu et al.
2012/0281319 A1 11/2012 Singleton et al.
2014/0022668 A1 1/2014 Takagishi et al.
2015/0138673 A1 5/2015 Adrong et al.
2015/0248903 A1 9/2015 Aoyama et al.
2016/0379674 A1 12/2016 Biskeborn et al.
2016/0379675 A1 12/2016 Biskeborn et al.

OTHER PUBLICATIONS

Non-Final Office Action from U.S. Appl. No. 14/752,931, dated Oct. 7, 2015.
Notice of Allowance from U.S. Appl. No. 14/752,931, dated Apr. 4, 2016.
Biskeborn et al., U.S. Appl. No. 15/175,980, filed Jun. 7, 2016.
Non-Final Office Action from U.S. Appl. No. 15/175,980, dated Dec. 23, 2016.
Biskeborn et al., U.S. Appl. No. 14/752,933, filed Jun. 27, 2015.
Non-Final Office Action from U.S. Appl. No. 14/752,933, dated Nov. 24, 2015.
Notice of Allowance from U.S. Appl. No. 14/752,933, dated Apr. 27, 2016.
Biskeborn et al., U.S. Appl. No. 15/175,903, filed Jun. 7, 2016.
Non-Final Office Action from U.S. Appl. No. 15/175,903, dated Dec. 16, 2016.
Biskeborn et al., U.S. Appl. No. 15/136,759, filed Apr. 22, 2016.
Notice of Allowance from U.S. Appl. No. 15/136,759, dated Nov. 18, 2016.
Biskeborn et al., U.S. Appl. No. 15/422,322, filed Feb. 1, 2017.
Non-Final Office Action from U.S. Appl. No. 15/422,322, dated Mar. 7, 2017.
Biskeborn et al., U.S. Appl. No. 15/445,861, filed Feb. 28, 2017.
Kim et al., "Characterization of an AlOx Tunneling Barrier in a Magnetic Tunnel Junction by a Surface Plasmon Resonance Spectroscopy Technique," IEEE Transactions on Magnetics, vol. 45, No. 1, Jan. 2009, pp. 60-63.
Non-Final Office Action from U.S. Appl. No. 14/534,098, dated Apr. 3, 2015.
Biskeborn et al., U.S. Appl. No. 141591,861, filed Jan. 7, 2015.
Biskeborn et al., U.S. Appl. No. 14/534,098, filed Nov. 5, 2014.
Non-Final Office Action from U.S. Appl. No. 14/591,861, dated Jul. 28, 2015.
Final Office Action from U.S. Appl. No. 14/534,098, dated Aug. 5, 2015.
Notice of Allowance from U.S. Appl. No. 14/534,098, dated Oct. 15, 2015.
Biskeborn et al., U.S. Appl. No. 14/996,061, filed Jan. 14, 2016.
Biskeborn et al., U.S. Appl. No. 15/466,540, filed Mar. 22, 2017.
Non-Final Office Action from U.S. Appl. No. 15/466,540, dated Oct. 5, 2017.
Notice of Allowance from U.S. Appl. No. 15/466,540, dated Feb. 9, 2018.

HYBRID DIELECTRIC GAP LINER AND MAGNETIC SHIELD LINER

BACKGROUND

The present invention relates to data storage systems, and more particularly, this invention relates to magnetic heads, e.g., magnetic tape heads, which include current-perpendicular-to-plane (CPP) sensors having hard spacers incorporated therewith.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a transducer structure. The transducer structure has a lower shield and an upper shield above the lower shield, the upper and lower shields providing magnetic shielding. A current-perpendicular-to-plane sensor is positioned between the upper and lower shields. An electrical lead layer is positioned between the sensor and one of the shields. The electrical lead layer is in electrical communication with the sensor. A resistance of the electrical lead layer along a direction orthogonal to a media facing surface is less than a resistance across the sensor along a direction parallel to the media facing surface. A spacer layer is positioned between the electrical lead layer and the one of the shields. One or both of the shields has at least one laminate pair comprising a magnetically permeable layer and a harder layer, where the harder layer has a mechanical hardness that is higher than a mechanical hardness of the magnetically permeable layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
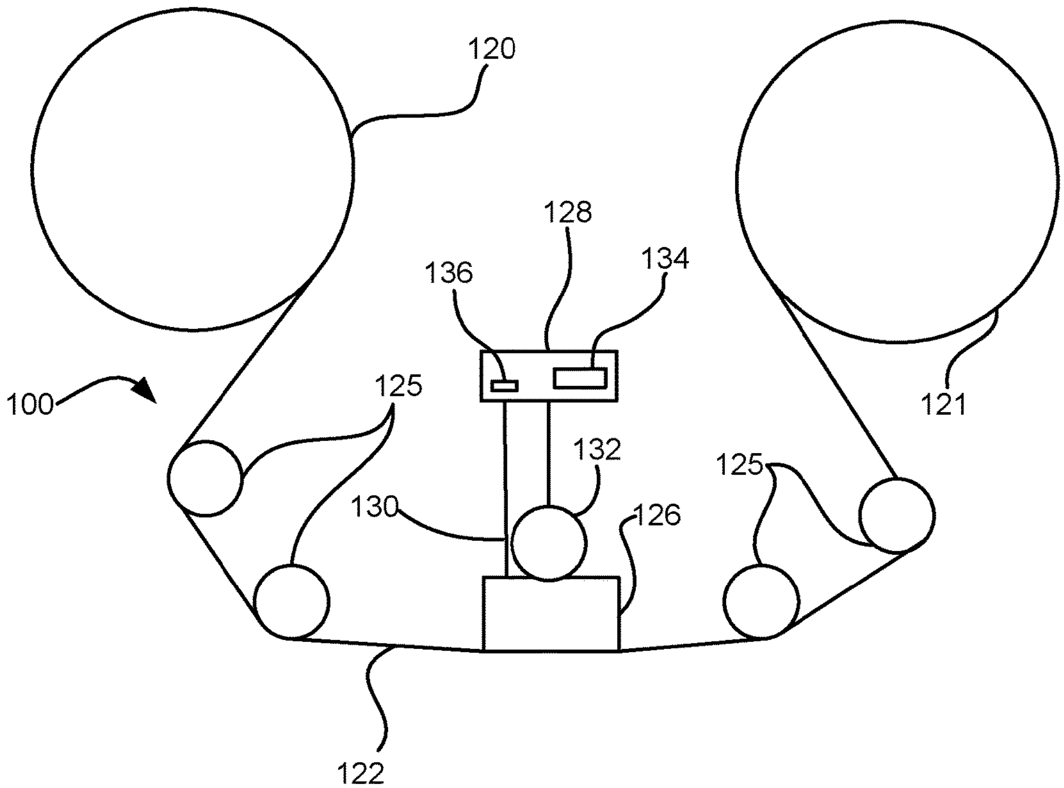
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having one or more heads which implement CPP sensors having hard spacers incorporated therewith. Thus, various embodiments described herein may reduce the probability of sensor shorting for CPP sensors, e.g., such as tunneling magnetoresistive (TMR) sensors, giant magnetoresistive (GMR), etc., as will be described in further detail below.

In one general embodiment, an apparatus includes a transducer structure. The transducer structure has a lower shield and an upper shield above the lower shield, the upper and lower shields providing magnetic shielding. A current-perpendicular-to-plane sensor is positioned between the upper and lower shields. An electrical lead layer is positioned between the sensor and one of the shields. The electrical lead layer is in electrical communication with the sensor. A spacer layer is positioned between the electrical lead layer and the one of the shields. A conductivity of the electrical lead layer is higher than a conductivity of the spacer layer. One or both of the shields has at least one laminate pair comprising a magnetically permeable layer and a harder layer, where the harder layer has a mechanical hardness that is higher than a mechanical hardness of the magnetically permeable layer.

In another general embodiment, an apparatus includes a transducer structure having a lower shield and an upper shield above the lower shield, the upper and lower shields providing magnetic shielding. A current-perpendicular-to-plane sensor is positioned between the upper and lower shields. An electrical lead layer is positioned between the sensor and one of the shields. The electrical lead layer is in electrical communication with the sensor. A spacer layer is positioned between the electrical lead layer and one of the shields. A product of the thickness of the spacer layer multiplied by the conductivity of the spacer layer is less than a product of the thickness of the electrical lead layer multiplied by the conductivity of the electrical lead layer. At least one of the shields has at least one laminate pair comprising a magnetically permeable layer and a harder layer, wherein the harder layer has a mechanical hardness that is higher than a mechanical hardness of the magnetically permeable layer.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
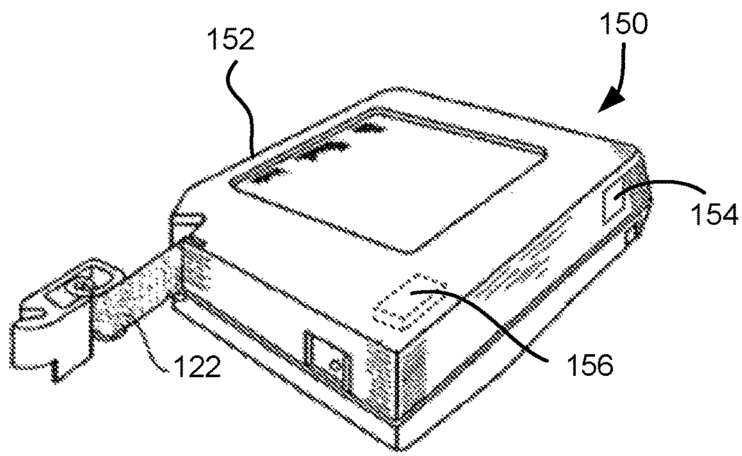
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
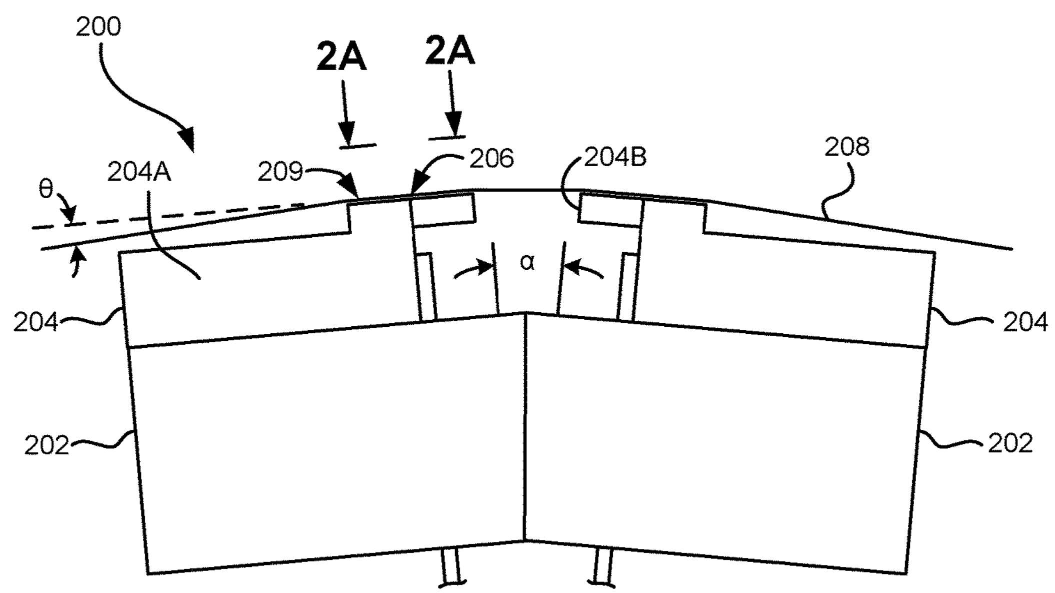
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle $\alpha$ with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle $\theta$ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
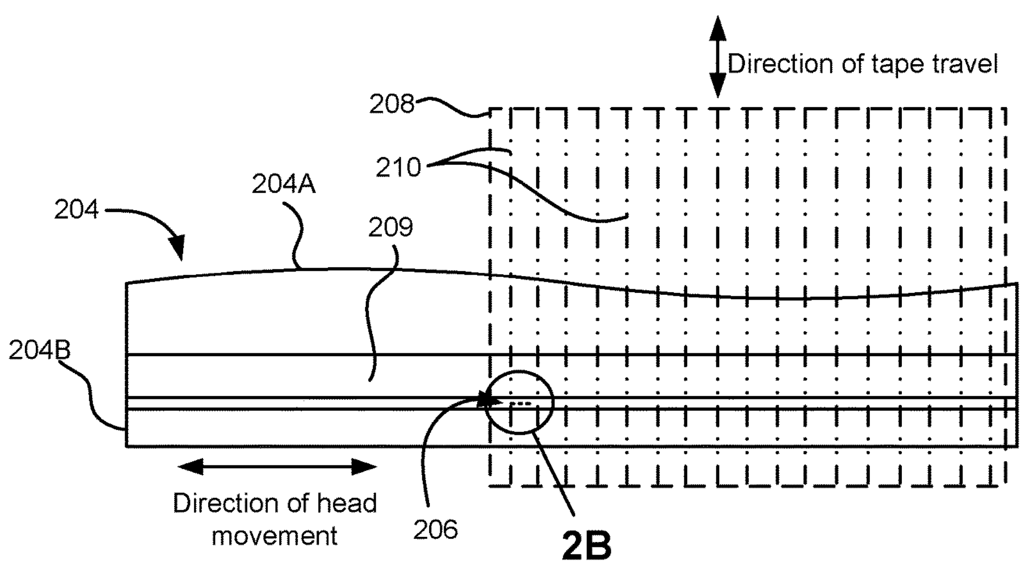
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
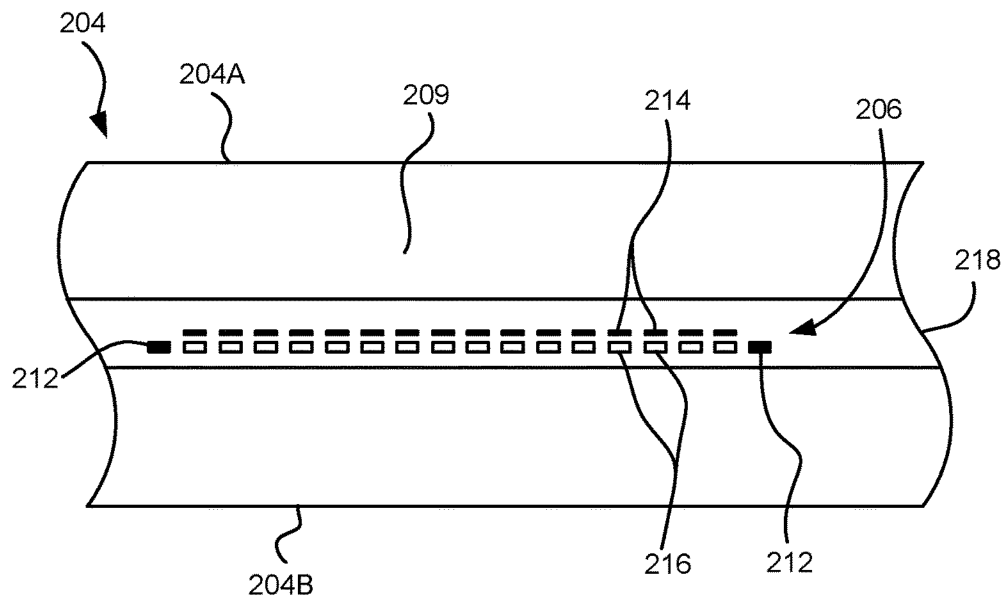
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
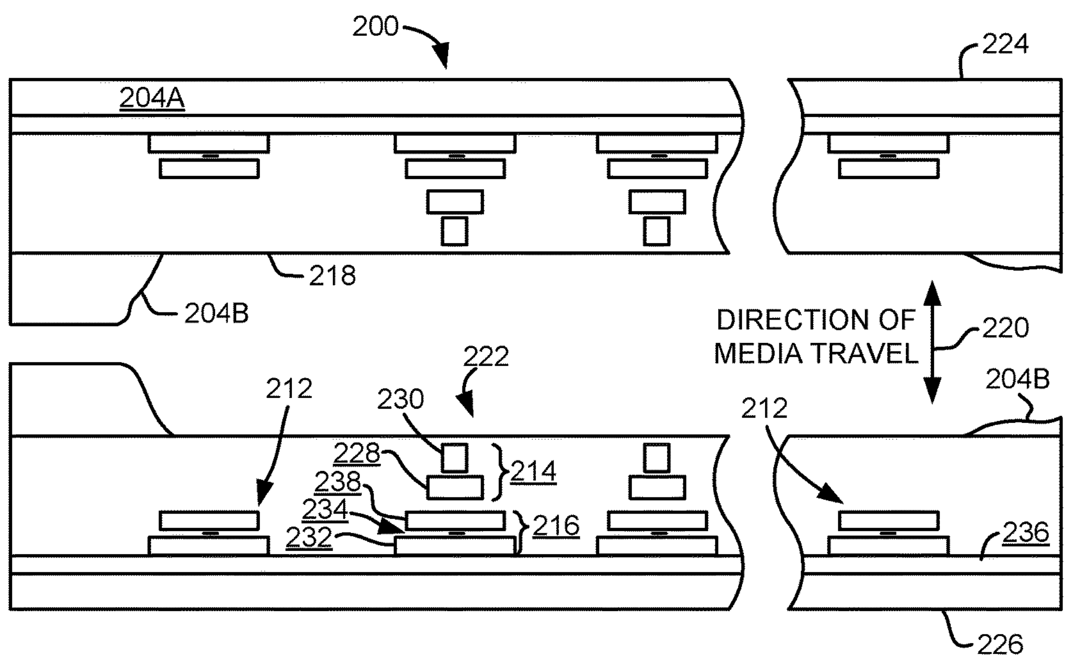
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetorisistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type of CPP sensor, including those based on MR, GMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
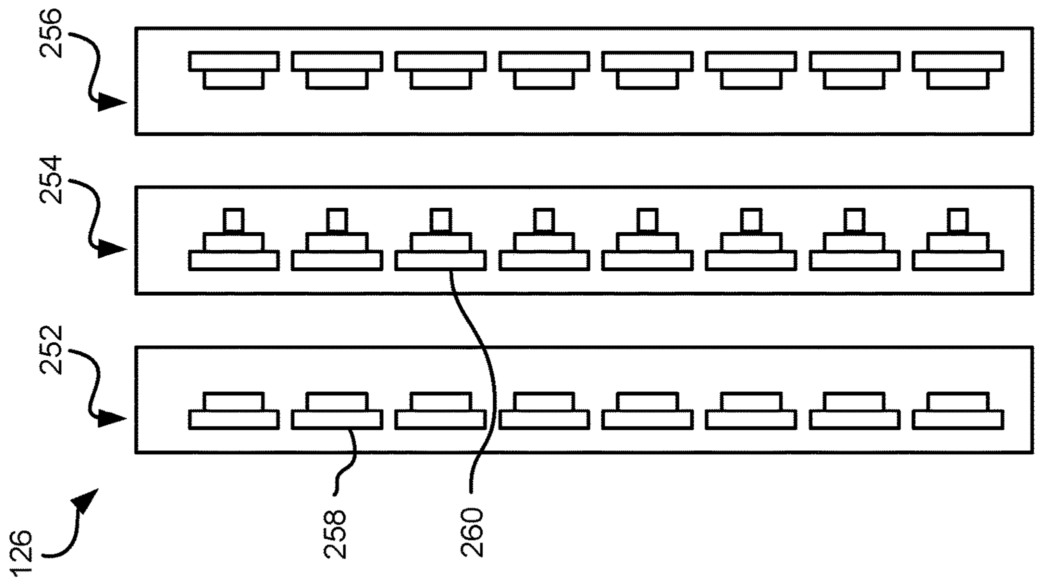
FIG. 4 is a partial tape bearing surface view of a magnetic head having a read-write-read configuration.
Figure 3:
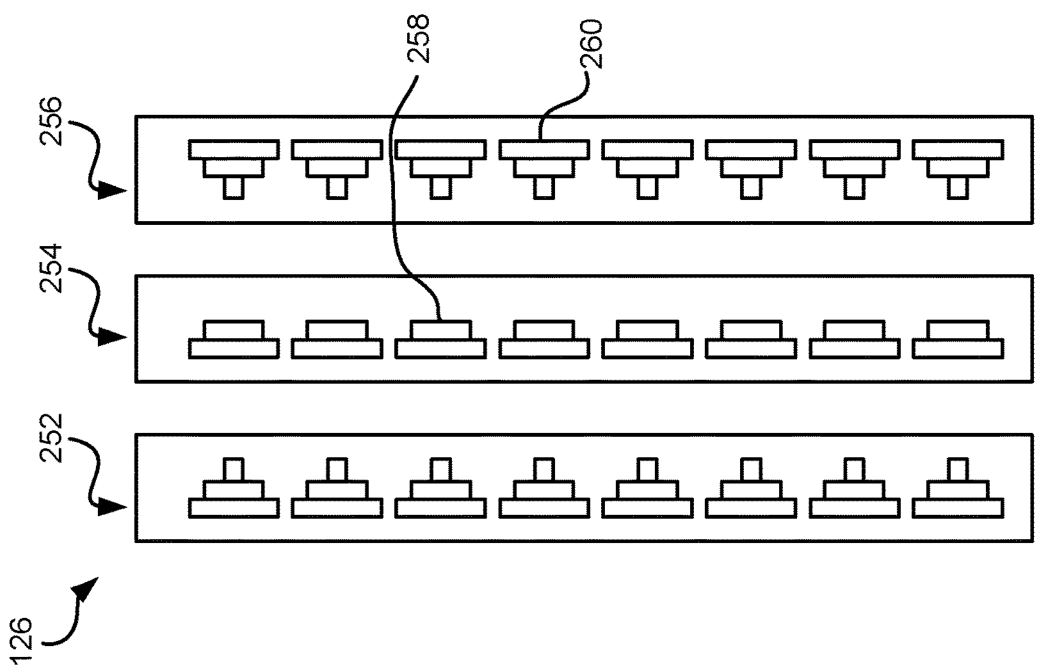
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
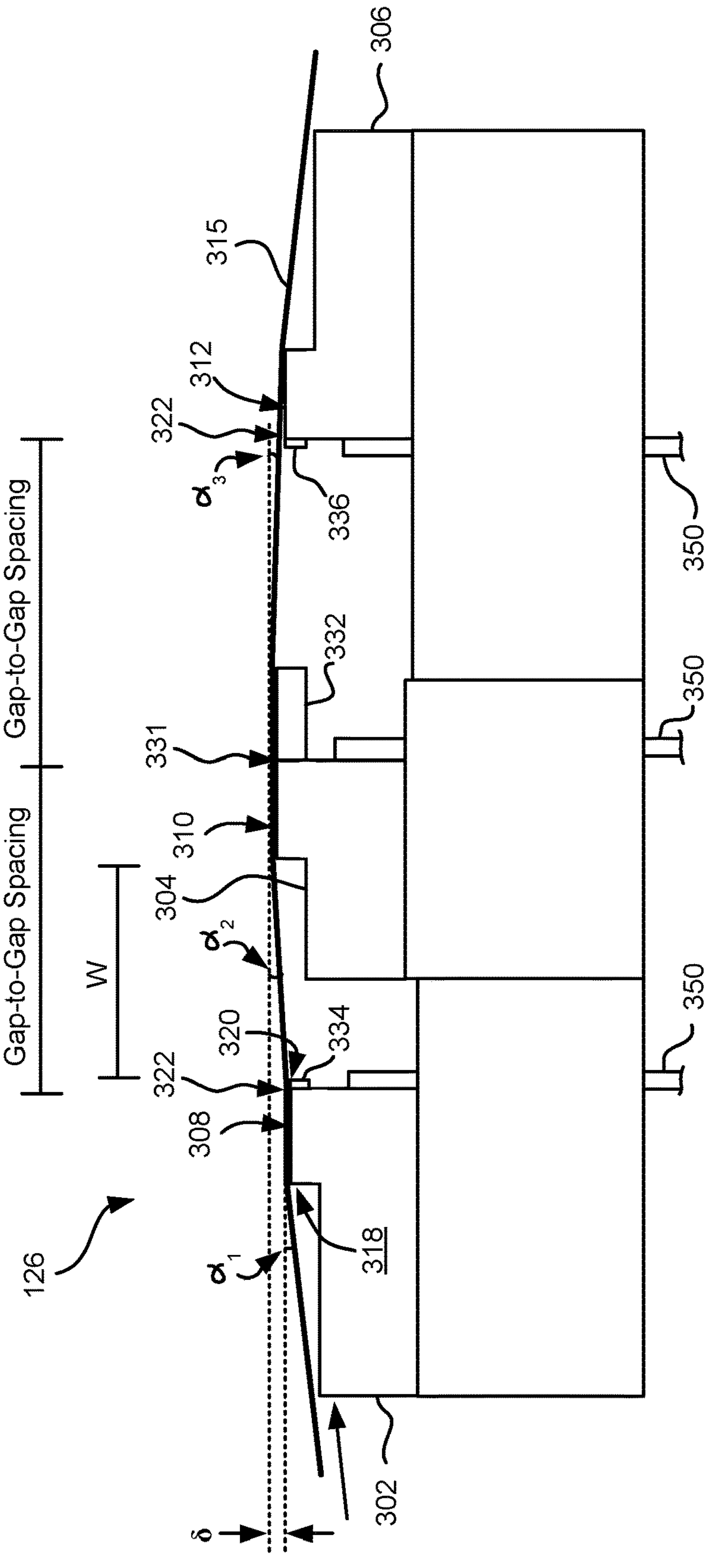
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
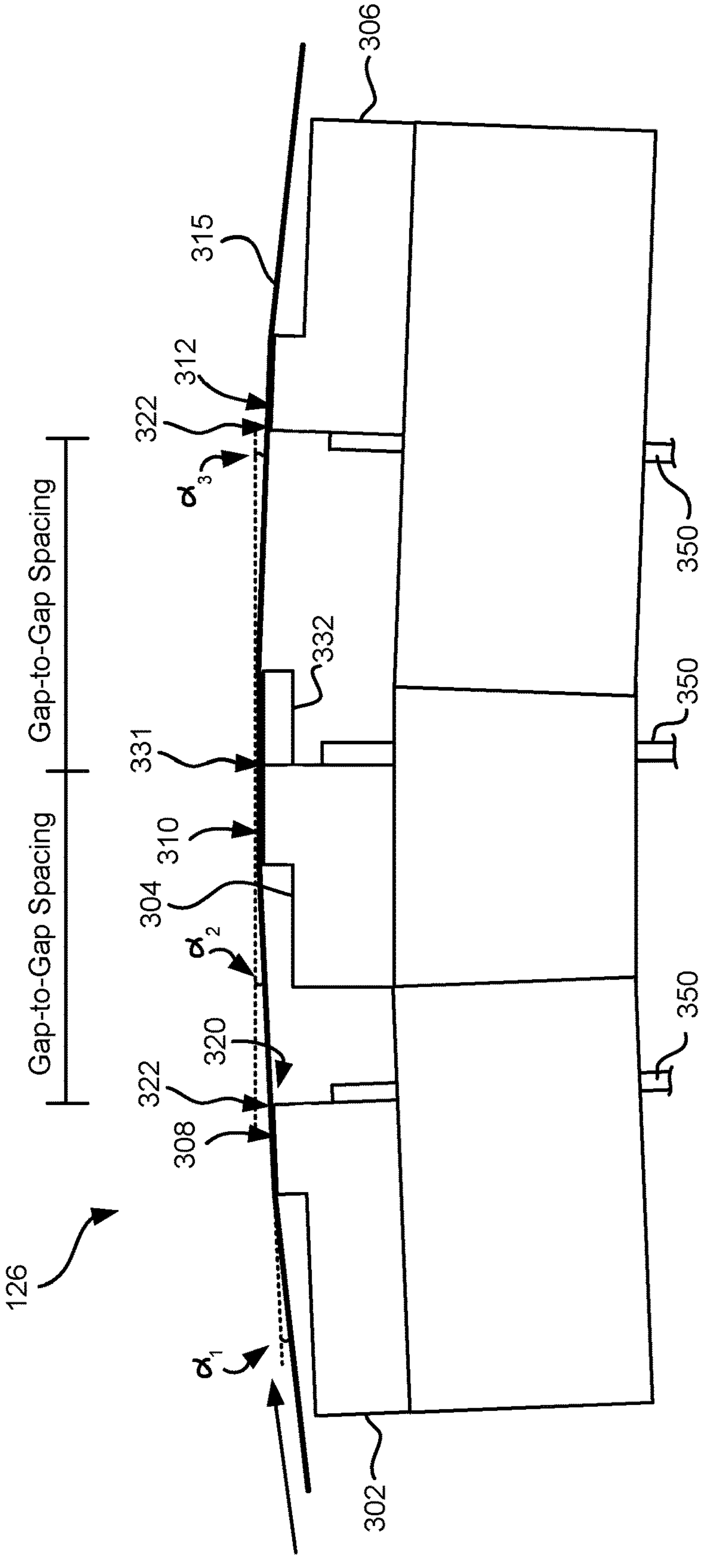
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
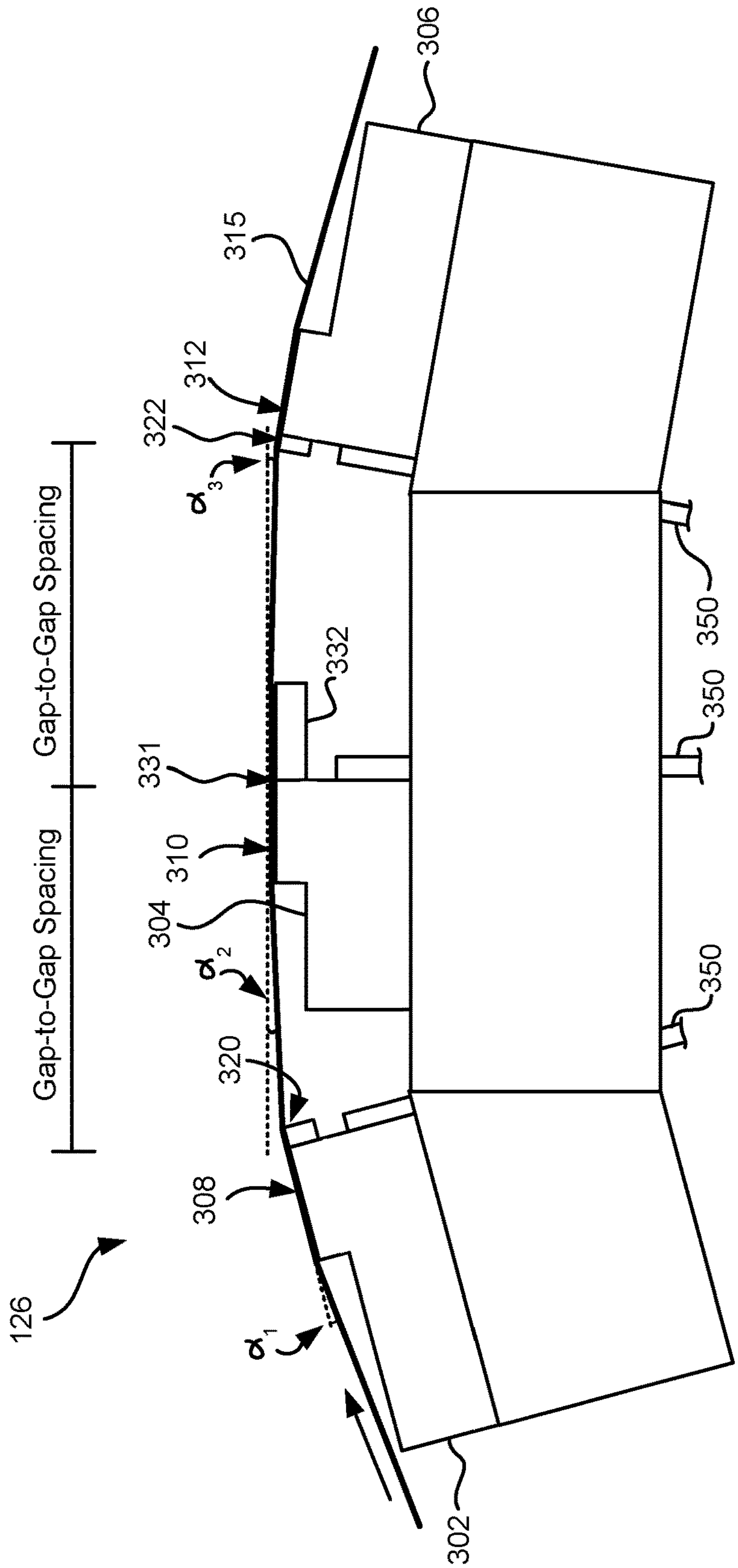
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

With continued reference to the above described apparatuses, it would be advantageous for tape recording heads to include CPP MR sensor technology, e.g., such as TMR and GMR. Furthermore, with the continued reduction of data track widths in magnetic storage technologies, CPP MR sensors enable readback of data in ultra-thin data tracks due to their high level of sensitivity in such small operating environments.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR and other CPP MR sensors are particularly susceptible to shorting during fabrication due to abrasive lapping particles that scratch or smear conductive material across the insulating materials separating the conductive leads, e.g., opposing shields, which allow sense (bias) current to flow through the sensor and magnetic head as whole. Friction between asperities on the tape and the ductile metallic films in the sensor gives rise to deformation forces in the direction of tape motion. As a result, an electrical short is created by the scratching and/or smearing across the layers which has a net effect of creating bridges of conductive material across the sensor. Particularly, the lapping particles tend to plow through ductile magnetic material, e.g., from one or both shields, smearing the metal across the insulating material, and thereby creating an electrical short that reduces the effective resistance of the sensor and diminishes the sensitivity of the sensor as a whole.

Scientists and engineers familiar with tape recording technology would not expect a CPP MR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3 to about 100 nanometers (nm). This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, smearing of the top or bottom shield material can bridge the insulation layer separating the hard bias magnet from the bottom lead and lower shield, thereby shorting the sensor. Further, shield deformation or smearing can create a conductive bridge across a tunnel barrier layer in a TMR sensor. Such tunnel barrier layer may be only 12 angstroms wide or less.

In disk drives, conventional CPP MR designs are acceptable because there is minimal contact between the head and the media. However, for tape recording, the head and the media are in constant contact. Head coating has been cited as a possible solution to these shorting issues; however tape particles and asperities have been known to scratch through and/or wear away these coating materials as well. Furthermore, conventional magnetic recording head coatings are not available for protecting against defects during lapping processes, as the coating is applied after these process steps. Because the insulating layers of a conventional CPP MR sensor are significantly thin, the propensity for electrical shorting due, e.g., to scratches, material deposits, surface defects, films deformation, etc., is high. Embodiments described herein implement novel spacer layers in combination with CPP MR sensors. As a result, some of the embodiments described herein may be able to reduce the probability of, or even prevent, shorting in the most common areas where shorting has been observed, e.g. the relatively larger areas on opposite sides of the sensor between the shields.

The potential use of CPP MR sensors in tape heads has heretofore been thought to be highly undesirable, as tape heads include multiple sensors, e.g., 16, 32, 64, etc., on a single die. Thus, if one or more of those sensors become inoperable due to the aforementioned shorting, the entire head becomes defective and typically would need to be discarded and/or replaced for proper operation of the apparatus.

Conventional current in-plane type sensors require at least two shorting events across different parts of the sensor in order to affect the sensor output, and therefore such heads are far less susceptible to shorting due to scratches. In contrast, tape heads with CPP MR sensors may short with a single event, which is another reason that CPP MR sensors have not been adopted into contact recording systems.

Various embodiments described herein have top and/or bottom shields electrically isolated from a CPP MR sensor, thereby improving the previously experienced issue of shield-to-sensor or shield-to-shield shorting which caused diminished sensor accuracy and/or total inoperability. Some of the embodiments described herein include spacer layers as gap liners which are preferably in close proximity to the sensing structure, thereby resisting deformation and thereby the previously experienced shorting as well, as will be described in further detail below.

Furthermore, various embodiments described herein include implementing one or more laminate pairs in addition to the spacer layers in a magnetic tape head to protect the tape head from shorting events. The laminate pair(s) include one or more pairings of a magnetically permeable layer and a harder layer between the magnetic shield and the tape head sensor to serve as a lining of the magnetic shield. In various embodiments, the combination of the laminate pair(s) lining the magnetic shield(s) and the spacer(s) that line the gap between the sensor and the magnetic shields may mitigate undesirable shorting events e.g., from erosion, smearing, and/or scratches, which would otherwise cause electrical shorting events, etc.

Figure 8A:
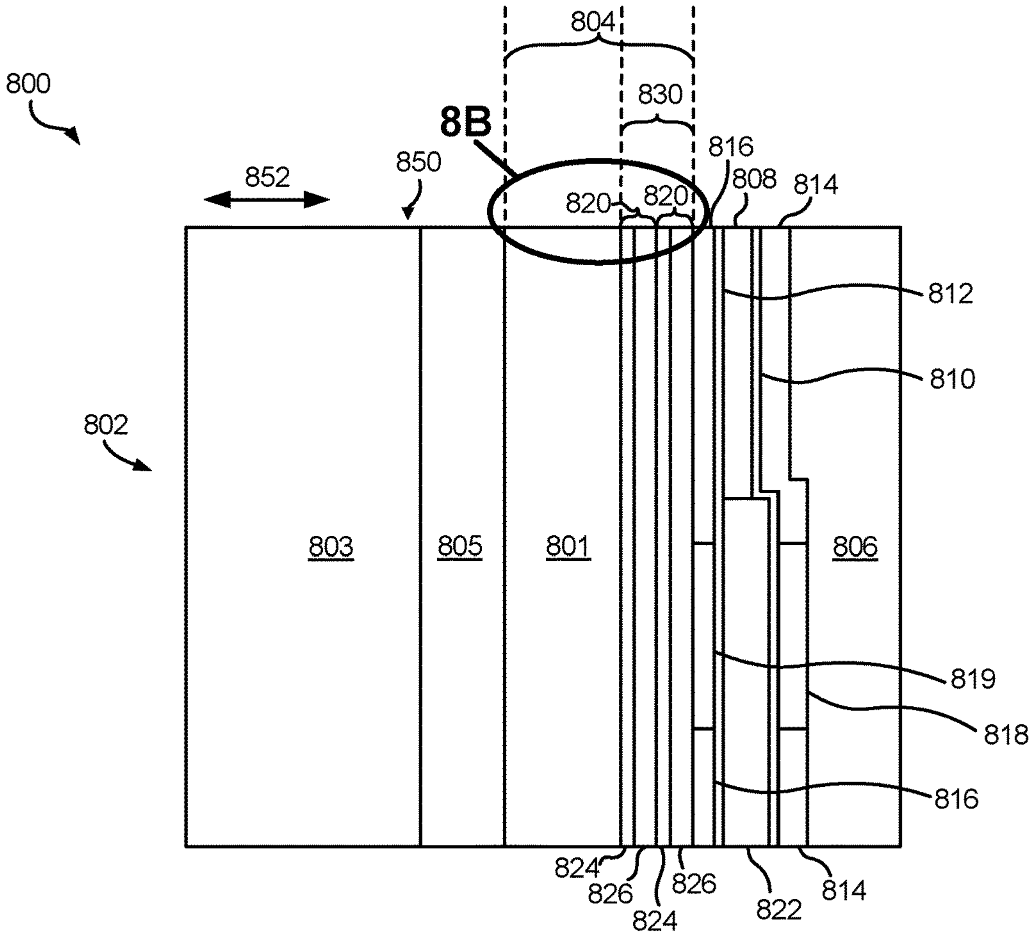
FIG. 8A is a partial cross-sectional view of a media facing side of a transducer structure according to various embodiments.

FIG. 8A depicts an apparatus 800, in accordance with one embodiment. As an option, the present apparatus 800 may be implemented in conjunction with features from any other embodiment listed herein, such as those described with reference to the other FIGS. However, such apparatus 800 and others presented herein may be used in various applications and/or in permutations which may or may not be specifically described in the illustrative embodiments listed herein. Further, the apparatus 800 presented herein may be used in any desired environment. Thus FIG. 8A (and the other FIGS.) may be deemed to include any possible permutation.

Looking to FIG. 8A, apparatus 800 includes a transducer structure 802. The transducer structure 802 may include a lower shield 804 above a wafer 803 and optional undercoat 805. Moreover, the transducer structure 802 may include an upper shield 806 positioned above the lower shield 804 (e.g., in a deposition direction thereof).

A CPP sensor 808 (e.g. such as a TMR sensor, GMR sensor, etc.) is positioned between the upper and lower shields 806, 804. As would be appreciated by one skilled in the art upon reading the present descriptions, according to preferred embodiments, the upper and lower shields 806, 804 provide magnetic shielding for the CPP sensor 808. Thus, according to various approaches, one or both of the upper and lower shields 806, 804 may desirably include a magnetic material of a type known in the art. It should be noted that in such approaches, the material of the upper and lower shields 806, 804 may vary, or alternatively be the same.

FIG. 8A further includes an upper electrical lead layer 810 positioned between the sensor 808 and the upper shield 806 (e.g., the shield closest thereto). Moreover, a lower electrical lead layer 812 is included between the sensor and the lower shield 804 (e.g., the shield closest thereto). The upper and lower electrical lead layers 810, 812 are preferably in electrical communication with the sensor 808, e.g., to enable an electrical current to pass through the sensor 808.

Upper and lower spacer layers 814, 816 are also included in the transducer structure 802. The spacer layers 814, 816 are dielectric in some approaches, but may be electrically conductive in other approaches. The spacer layers 814, 816 preferably have a very low ductility, e.g., have a high resistance to bending and deformation in general, and ideally a lower ductility than refractory metals such as Ir, Ta, and Ti. Upper spacer layer 814 is positioned such that it is sandwiched between the upper electrical lead layer 810 and the upper shield 806 (e.g., the shield closest thereto). Similarly, the lower spacer layer 816 is positioned between the lower electrical lead layer 812 and the lower shield 804 (e.g., the shield closest thereto).

Although it is preferred that a spacer layer is included on either side of the sensor 808 along the intended direction of tape travel 852, some embodiments may only include one spacer layer positioned between one of the leads and the shield closest thereto, such that at least one of the leads, and preferably both leads, are electrically isolated from the shield closest thereto at the tape bearing surface.

As described above, it is not uncommon for tape asperities passing over the sensor to smear the material of an upper or lower shield onto the opposite shield, thereby potentially shorting the sensor. Upper and lower spacer layers 814, 816 reduce the probability of a smear occurring in the sensor region. Moreover, because the upper and lower electrical lead layers 810, 812 are separated from the upper and lower shields 806, 804 at the tape bearing surface by the upper and lower spacer layers 814, 816 respectively, the probability of a smear bridging the upper and lower electrical lead layers 810, 812 is minimized.

Thus, as illustrated in FIG. 8A, it is preferred that the spacer layers 814, 816 are positioned at the media facing surface 850 of the transducer structure 802, e.g., such that the sensor 808 and/or electrical lead layers 810, 812 are separated from the upper and lower shields 806, 804, thereby reducing the chance of a shorting event occurring. Moreover, it is preferred that the material composition of the spacer layers 814, 816 is sufficiently resistant to smearing and/or plowing of conductive material across the sensor 808. Thus, the spacer layers 814, 816 are preferably hard, e.g., at least hard enough to prevent asperities in the tape passing over the transducer structure 802 from causing deformations in the media facing surface 850 of the transducer structure 802 which effect the performance of the sensor 808. In preferred embodiments, the spacer layers 814, 816 include aluminum oxide. However, according to various embodiments, the spacer layers 814, 816 may include at least one of ruthenium, aluminum oxide, chrome oxide, silicon nitride, boron nitride, silicon carbide, silicon oxide, titanium oxide, titanium nitride, ceramics, etc., and/or combinations thereof. In some approaches, the spacer layers 814, 816 may be the same. In other approaches, the spacer layers 814, 816 may be different.

Furthermore, in various embodiments, the electrical lead layers 810, 812 may include any suitable conductive material, e.g., which may include Ir, Cu, Ru, Pt, NiCr, Au, Ag, Ta, Cr, etc.; a sandwiched structure of Ta (e.g. Ta/X/Ta); conductive hard alloys such as titanium nitride, boron nitride, silicon carbide, and the like. In some approaches, the electrical lead layers 810, 812 be the same. In other approaches, the electrical lead layers 810, 812 may be different.

Previously, magnetic heads having aluminum oxide implemented at the recording gap (even amorphous aluminum oxide) were found to have an undesirably low resistance to wear resulting from use, e.g., having a magnetic tape run over the recording gap. Thus, the inventors did not expect transducer structures 802 having aluminum oxide spacer layers 814, 816 to exhibit good performance in terms of resisting smearing and/or plowing caused by tape being run thereover. This idea was further strengthened in view of the lack of materials and/or layers present to promote the growth of crystalline aluminum oxide, the growth of which was thereby not supported. However, in sharp contrast to what was expected, the inventors discovered that implementing aluminum oxide spacer layers 814, 816 effectively resisted deformation caused by the magnetic tape. Moreover, experimental results achieved by the inventors support this surprising result, which is contrary to conventional wisdom.

Without wishing to be bound by any theory, it is believed that the improved performance experienced by implementing aluminum oxide spacer layers 814, 816 may be due to low ductility of alumina, relatively high hardness, and low friction resulting between the aluminum oxide spacer layers and defects (e.g., asperities) on a magnetic tape being passed thereover. This is particularly apparent when compared to the higher resistance experienced when metal films and/or coating films are implemented. Specifically, coatings may not be effective in preventing shorting because underlying films (e.g., such as permalloy) are still susceptible to indentation, smearing, plowing, deformation, etc.

Thus, in an exemplary approach, the upper and/or lower spacer layers may include an aluminum oxide which is preferably amorphous. Moreover, an amorphous aluminum oxide spacer layer may be formed using sputtering, atomic layer deposition, etc., or other processes which would be appreciated by one skilled in the art upon reading the present description. According to another exemplary approach, the upper and/or lower spacer layers may include an at least partially polycrystalline aluminum oxide.

Although upper and lower spacer layers 814, 816 separate upper and lower electrical lead layers 810, 812 from the upper and lower shields 806, 804, respectively, at the media facing surface 850 of the transducer structure 802, the upper and/or lower electrical lead layers 810, 812 are preferably still in electrical communication with the shield closest thereto.

According to various embodiments, a magnetic shield may optionally have a non-laminated magnetic portion and a laminated portion. As illustrated in FIG. 8A, the lower magnetic shield 804 includes a non-laminated portion 801 and a laminated portion 830 that preferably includes at least two laminate pairs 820, where each laminate pair 820 includes a magnetically permeable layer 826 paired with harder layer 824. However, according to various other embodiments, a magnetic shield may include one, two, at least three, at least four, at least six, ten or more, etc., laminate pairs 820. The number of laminate pairs 820 may vary depending on the embodiment, e.g., depending on fabrication limitations, in accordance with material characteristics, depending on design preferences, etc.

It should be noted that the present apparatus 800 and the portions of the lower shield 804 may be implemented in conjunction with features from any other embodiment listed herein, such as those described with reference to the FIGS. 8C and 8D and the portions of the upper shield 806. The laminate liner of the magnetic shields as described for the lower shield in FIGS. 8A and 8B may also be described in reference to the upper shield in FIG. 8C and the upper and lower shields 804, 806 as described in FIG. 8D.

The non-laminated magnetic portion 801 may be formed using any fabrication technique that would be appreciated by one skilled in the art upon reading the present descriptions. For example, the non-laminated magnetic portion 801 may be formed using, e.g., plating, sputtering, etc. Plating techniques may be reserved for films thicker than 0.3 microns according to one approach.

Because the laminate pairs 820 are electrically nonconductive, only a portion of the shields 804, 806 may be used as a lead in a CPP sensor structure in some embodiments, e.g., as where a magnetically permeable layer 826 is proximate the spacer layer 814, 816, as would be appreciated by one skilled in the art upon reading the present description.

In various embodiments, at least one of the shields 804, 806 may include at least one laminate pair 820 comprising magnetically permeable layer 826 and a harder layer 824. In some approaches, the harder layer 824 may have a mechanical hardness higher than a mechanical hardness of the magnetically permeable layer 826. In some approaches, the harder layer 824 may have a shear modulus higher than a shear modulus of the magnetically permeable layer 826. In some approaches, the harder layer 824 may have a Young's modulus higher than a Young's modulus of the magnetically permeable layer 826. The harder layer 824 may be magnetic in some approaches, and nonmagnetic in other approaches.

In some embodiments, at least one of the shields may have at least two of the laminate pairs 820. In other embodiments, the magnetic shield(s) may further include a non-laminated magnetic portion 801 sandwiching the at least one laminate pair 820 between the non-laminated magnetic portion 801 and the sensor 808. As illustrated in FIG. 8A, the lower shield 804 includes two laminate pairs 820 positioned between the non-laminated portion 801 of the lower shield 804 and the sensor 808.

Implementing a laminated portion 830 having multiple laminate pairs 820 as a lining to a magnetic shield may desirably provide improved overall shield characteristics. For example, in response to implementing robust materials to the electrically nonconductive nonmagnetic harder layers 824, the magnetic shield 804 may have an improved resistance to wear, while the magnetically permeable layers 826 may preserve the magnetic functionality of the magnetic shield 804.

It follows that laminate pairs 820 may prevent substantial wear of the tape head in areas where media is prone to contacting the head, e.g., a tape passing over the head without hindering performance. This improved resistance to wear provided by the smear-resistant and/or abrasion-resistant magnetic shield configurations described herein, is particularly desirable in view of the continued efforts to reduce track widths and more particularly the space between magnetic shields and the separation between head and tape.

Figure 8B:
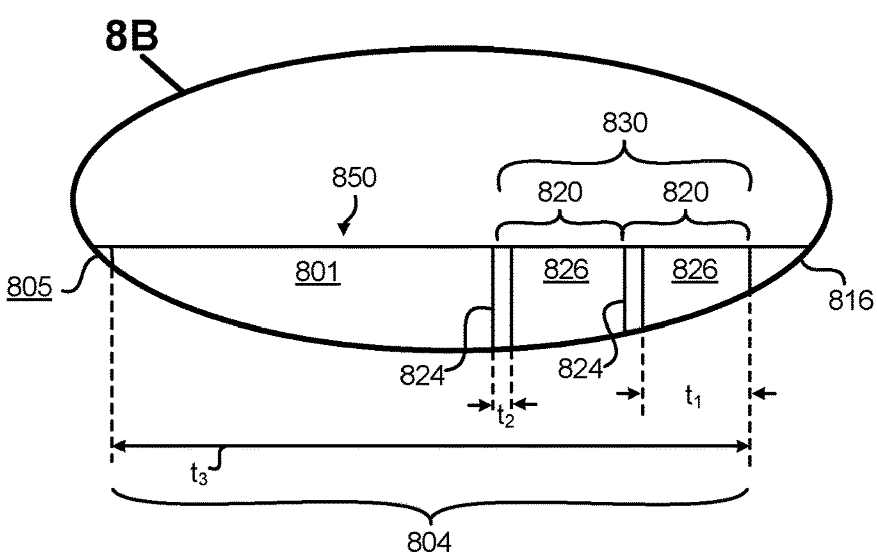
FIG. 8B is a detailed view taken from Oval 8B of FIG. 8A.

Looking to FIG. 8A and the magnified portion 8B of FIG. 8A as shown in FIG. 8B, in some embodiments, the lower shield 804 may have a non-laminated magnetic portion 801 and a laminated portion 830. The laminated portion 830 may include at least one, but preferably includes at least two laminate pairs 820, where each laminate pair 820 includes a magnetically permeable layer 826 paired with a harder layer 824.

Moreover, the inventors discovered that magnetic shielding properties of the magnetic shields 804, 806 may be enhanced by implementing laminate pairs 820 having layers with thicknesses within certain ranges.

As illustrated in FIG. 8B, preferred deposition thicknesses of some of the layers of apparatus 800 will now be disclosed. It is generally preferred that a deposition thickness ($t_1$) of the magnetically permeable layers 826 in each laminate pair 820 is greater than a deposition thickness ($t_2$) of the harder layers 824 of the laminate pairs 820. For example, the deposition thickness $t_2$ of the harder layer 824 in each laminate pair 820 may be about 10% or less of a total deposition thickness of the laminate pair 820, and preferably about 10% or less of a total deposition thickness of the laminate pair 820. Accordingly the deposition thickness $t_1$ of the magnetically permeable layer 826 in each laminate pair 820 may be about 90% or more of a total deposition thickness of the laminate pair 820.

According to an illustrative range, the magnetically permeable layer 826 in each laminate pair 820 may have a deposition thickness $t_1$ that is between about 2 and about 100 nanometers, more preferably between about 20 and about 75 nanometers, but may be higher or lower depending on the desired embodiment. For example, the deposition thickness of magnetically permeable layer 826 described herein may vary to ensure that apparatus 800 has low coercivity (Hc) in both easy and hard axis directions. Furthermore, the deposition thickness of magnetically permeable layer 826 may vary to ensure a high magnetic moment in apparatus 800. For example a high magnetic moment may correspond to greater than approximately 1 Tesla (T).

The harder layer 824 in each laminate pair 820 may have a deposition thickness $t_2$ that is between about 1 and about 20 nanometers, preferably between about 1 and about 12 nanometers. According to preferred embodiments, the harder layer 824 in each laminate pair 820 may have a deposition thickness $t_2$ that is less than about 8 nanometers. A harder layer 824 thickness in each and/or some laminate pairs 820 of less than about 8 nanometers was found to provide better shielding than a comparable structure having a monolithic shield of the magnetic material.

However, according to some embodiments, one or more of the harder layers 824 may have a deposition thickness $t_2$ greater than 12 nanometers, e.g., to provide a strong structural integrity of apparatus 800. Furthermore, the harder layers 824 in the various laminate pairs 820 may vary in deposition thickness, deposition material(s), fabrication process, etc., from one another in embodiments which include more than one laminate pairs 820.

Furthermore, each of the magnetically permeable layers 826 in each laminate pair 820 may vary in deposition thickness, deposition material(s), fabrication process, etc., from one another in embodiments which include more than one laminate pair 820.

In some embodiments, the harder layer 824 in the laminate pair 820 may be magnetically permeable. In other approaches, the harder layer 824 in the laminate pair 820 may be nonmagnetic.

Moreover, in some embodiments, the harder layer 824 in the laminate pair 820 may be electrically conductive. In other approaches the harder layer 824 in the laminate pair 820 may be dielectric.

One or more of the magnetically permeable layers 826 may include permalloy, CZT, magnetically similar alloys, etc., and/or other magnetic materials of a type known in the art, e.g., such as Fe(N). Moreover, one or more of the harder layers 824 may include iron nitride, iridium, aluminum oxide ($Al_2O_3$), silicon oxide (e.g., $SiO_2$), silicon nitride ($Si_3N_4$), titanium oxide ($TiO_x$), magnesium oxide ($MgO_x$), etc., and/or other relatively dense, hard and/or non-ductile electrically nonconductive nonmagnetic materials of a type known in the art. An electrically conductive nonmagnetic layer may be used in place of a harder layer or layers 824, e.g., in any of the Figures.

In embodiments that include more than one laminate pair 820, according to one approach, the harder layers 824 of the laminate pairs 820 may be the same and formed from the same type of electrically nonconductive nonmagnetic material. In other approaches, the harder layers 824 of the laminate pairs 820 may the same but each layer may be formed from a composite of varying types of electrically nonconductive nonmagnetic material. In yet other approaches, the harder layers 824 of two or more laminate pairs 820 may differ between laminate pairs 820, and each harder layer 824 may be formed from varying electrically nonconductive nonmagnetic materials, either as a single material or a composite of different materials. According to yet other approach, some of the laminate pairs 820 include harder layers 824 formed of the same electrically nonconductive nonmagnetic material, while the remaining laminate pairs 820 include harder layers 824 formed from varying electrically nonconductive nonmagnetic materials.

Similarly, in embodiments which include more than one laminate pair 820, according to one approach, the magnetically permeable layers 826 of the laminate pairs 820 may be the same and formed from the same type of magnetic material. In other approaches, the magnetically permeable layers 826 of the laminate pairs 820 may the same but each layer may be formed from composite of varying types of magnetic material. In yet other approaches, the magnetically permeable layers 826 of two or more laminate pairs 820 may differ between laminate pairs 820, and each magnetically permeable layer 826 may be formed from varying magnetic materials, either as a single magnetic material or a composite of different magnetic materials. According to yet other approach, some of the laminate pairs 820 include magnetically permeable layers 826 formed of the same magnetic material, while the remaining laminate pairs 820 include magnetically permeable layers 826 formed from varying magnetic materials.

In order to further improve magnetic shielding in apparatus 800, the laminated portion 830 of the shields 804, 806 may, according to various embodiments, account for as great a portion of the overall shields 804, 806 as processing (e.g., liftoff, milling, etc.) and/or tape drive functionality constraints allow. Thus, according to some embodiments, the entirety of the one or more magnetic shields 804, 806 may be laminated. In other words, one or both of the magnetic shields 804, 806 may not include a non-laminated magnetic portion 801 in some embodiments. According to other embodiments, the laminated portion 830 may account for a majority of the one or more magnetic shields 804, 806 while non-laminated magnetic portion 801 accounts for a minority of the one or more shields. However, according to yet further embodiments, the thickness of the laminated portion 830 may account for about 10% or less of the thickness of the overall magnetic shield 804, 806. Accordingly, in such embodiments the non-laminated magnetic portion 801 may account for about 90% or more of the thickness of the overall magnetic shield 804, 806.

According to preferred embodiments, the thickness $t_3$ of each of the magnetic shields 804, 806 in an intended media travel direction 852 may be 2 to about 10 times a media wavelength of a frequency of a recording code compatible with the sensor structure 808, and in some approaches is 2 to about 10 times a media wavelength of a lowermost frequency of a recording code compatible with the sensor structure 808. The media wavelength of a frequency of a recording code may be described as the average pattern repetition length that resides between portions of data written to media, e.g., tape in the current embodiment. For example, according to various embodiments, the media wavelength may be about 0.2 to about 2 microns, but could be higher or lower depending on the embodiment.

Various embodiments preferably include multiple laminate pairs 820, e.g., to achieve a thickness $t_3$ of the magnetic shields 804, 806 as described above. For example, in some embodiments, apparatus 800 may include up to about 10 laminate pairs 820 on each side of the magnetic sensor structure 808 (e.g., in each magnetic shield 804, 806). It follows that the configuration of the laminate pairs 820, e.g., number of laminate pairs 820 on each side of the sensor structure 808, total number of laminate pairs 820, thickness of each individual laminate pair 820, etc., may vary depending on the embodiment. For example, embodiments associated with a low media wavelength may have magnetic shields 804, 806 with a low thickness $t_3$ (e.g., still about 5 to about 10 times the low media wavelength), thereby allowing the laminated portion 830 to account for a greater amount of the overall magnetic shields 804, 806.

In one embodiment illustrated FIG. 8C, an apparatus 840 includes a lower magnetic shield 804 below the sensor 808 and an upper magnetic shield 806 above the sensor 808. An upper nonmagnetic spacer 814 may be positioned between the upper shield 806 and the sensor, and a lower nonmagnetic spacer 816 may be positioned between the lower shield 804 and the sensor 808. In addition, the upper shield 806 may have a non-laminated magnetic portion 801 and a laminated portion 830. The laminated portion 830 may include one, but preferably includes at least two laminate pairs 820, where each laminate pair 820 includes a magnetically permeable layer 826 paired with harder layer 824. However, according to various embodiments, the upper magnetic shield 806 may include one, at least three, at least four, at least six, ten or more, etc., laminate pairs 820. The number of laminate pairs 820 may vary depending on the embodiment, e.g., depending on fabrication limitations, in accordance with material characteristics, depending on design preferences, etc.

It should be noted that the non-laminated magnetic portion 801 may be formed using any fabrication technique that would be appreciated by one skilled in the art upon reading the present descriptions. For example, the non-laminated magnetic portion 801 may be formed using, e.g., plating, sputtering, etc. Plating techniques may be reserved for films thicker than 0.3 microns according to one approach.

Figure 8C:
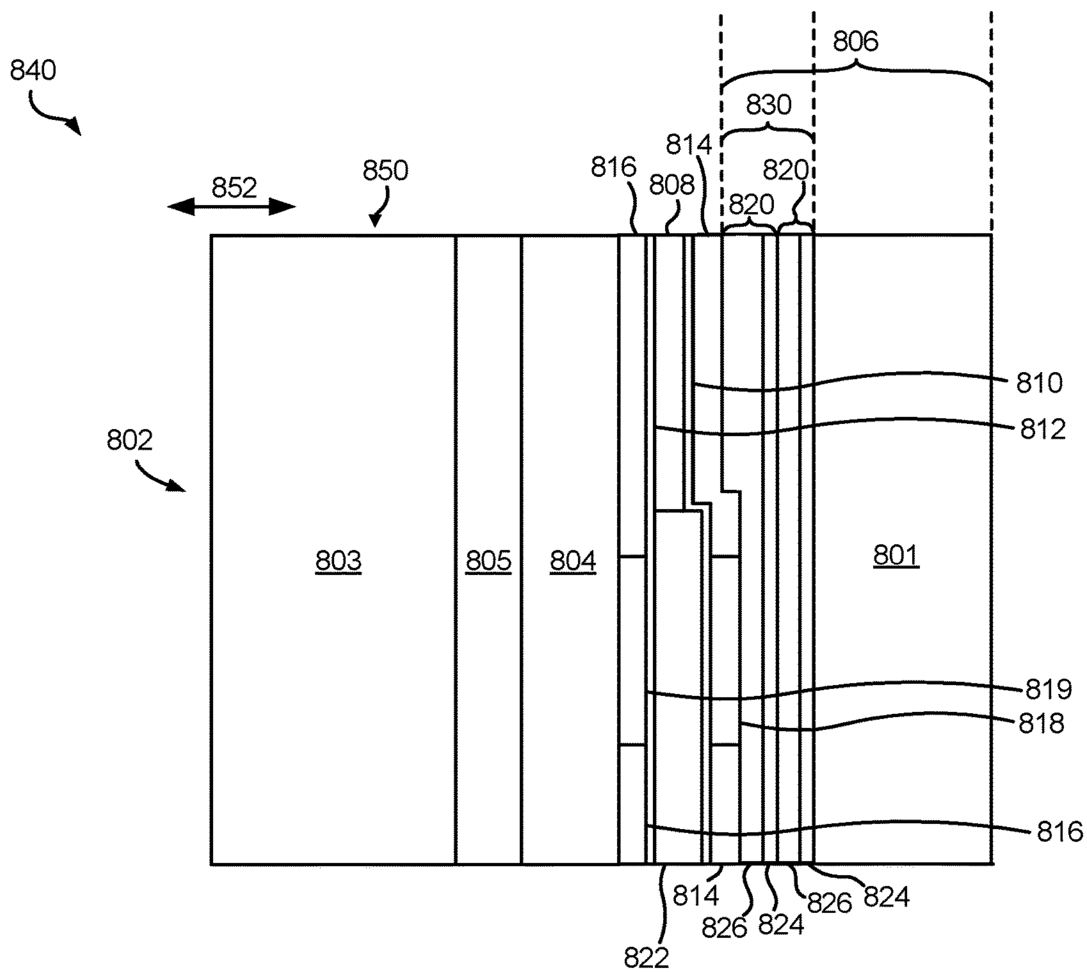
FIGS. 8C-8D are partial cross-sectional views of a media facing side of a transducer structure according to various embodiments.
Figure 8D:
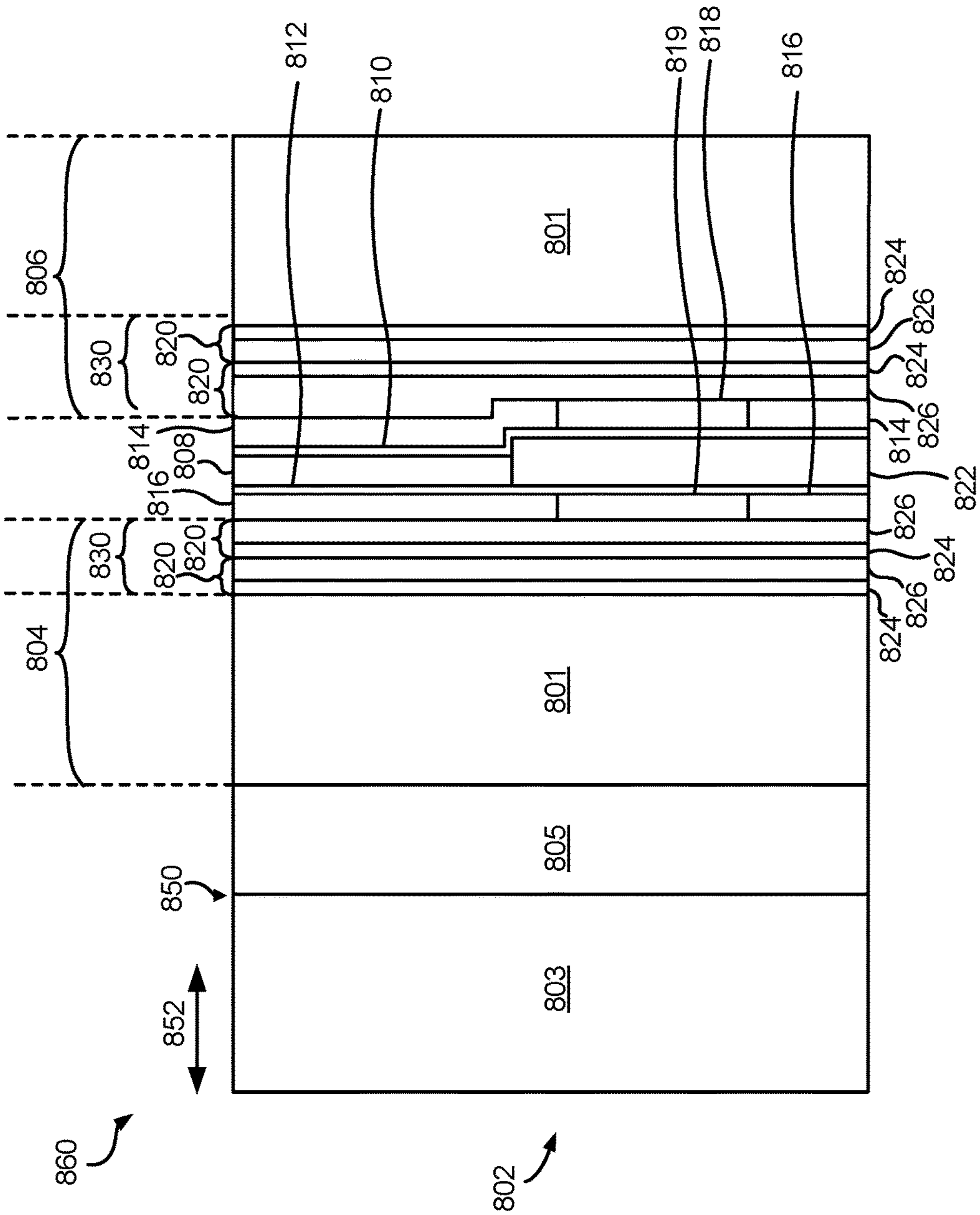

In another embodiment as shown in FIG. 8D, an apparatus 860 includes an upper shield 806 above the sensor 808 and a lower shield 804 below the sensor 808. An upper nonmagnetic spacer 814 may be positioned between the sensor 808 and the upper shield 806, and a lower nonmagnetic spacer 816 may be positioned between the sensor 808 and the lower shield 804. As illustrated in FIG. 8D, each shield 804, 806 may be lined with laminate portion 830 that is sandwiched between the non-laminate portion 801 of the magnetic shields 804, 806 and the respective spacer 816, 814. The laminate portion 830 of the shields 804, 806 includes one or more laminate pairs 820, and each laminate pair 820 includes a magnetically permeable layer 826 and a harder layer 824.

As mentioned above, the magnetic shield(s) 804 and/or 806 of apparatus 800 may include a non-laminated magnetic portion 801. As illustrated in FIG. 8A, 8C-8D, each of the non-laminated magnetic portions 801 may sandwich the laminate pairs 820 in the same shield therewith between the non-laminated magnetic portion 801 and the sensor structure 808. Although apparatus 860 as shown in FIG. 8C includes two non-laminated magnetic portions 801, e.g., a non-laminated magnetic portion 801 on each side of the sensor structure 808, sandwiching the laminate pairs 820 between the respective non-laminated magnetic portion 801 and the sensor structure 808, in other embodiments, as shown with apparatus 800 in FIG. 8A and apparatus 840 in FIG. 8C, only a single non-laminated magnetic portion 801 may be included on a single side of the sensor structure 808, e.g., sandwiching the corresponding laminate pairs 820 on the single side of the sensor structure 808 between the non-laminated magnetic portions 801 and the sensor structure 808, etc. In other words, only one of the magnetic shields 804, 806 may include a non-laminated magnetic portion 801.

An upper magnetic shield 806 as illustrated in apparatus 840 in FIG. 8C and apparatus 860 in FIG. 8D may have similar or the same structure and/or properties as magnetic shield 804 (in FIG. 8A). For example, similar to magnetic shield 804, the upper magnetic shield 806 may have at least two laminate pairs 820, where each pair 820 includes a magnetically permeable layer 826 and a harder layer 824. In other embodiments, the number of laminate pairs 820 in the lower magnetic shield 804 may be different than the number of laminate pairs 820 in the upper magnetic shield 806.

Embodiments which include CPP sensors may include an electrical connection to a magnetic lamination or layer proximate to the sensor, to a spacer layer 814, 816 positioned between the sensor structure 808 and one or both magnetic shields 804, 806, and/or to the sensor 808 itself. For example, such embodiments may include an electrical lead proximate to the sensor for enabling current flow through the sensor structure. Such leads may be an extension of a layer itself, or a separately-deposited material. Establishing an electrical connection to a magnetic lamination proximate to the sensor and/or to the spacer itself may create a configuration in which portions of the magnetic shields of an apparatus are not biased or current-carrying e.g. the shields are "floating". In such embodiments, the nonmagnetic spacer layer 814, 816 included between the sensor structure 808 and the magnetic shields 804, 806 may serve as an electrical lead. These portions may be biased according to various embodiments.

Embodiments described herein may advantageously protect the tape head of tape drive (e.g., see 100 of FIG. 1A) from, e.g., erosion, smearing, scratches, etc., which may cause electrical shorting events. Furthermore, the laminate pairs 820 may be implemented such that the magnetic shields (e.g., see magnetic shields 804, 806 of FIG. 8A-8D) have enhanced magnetic permeability and/or improved mechanical stability when compared to common highly magnetically permeable magnetic shield materials of similar dimensions.

Moreover, referring now to the magnetic stability of embodiments described herein, e.g., the configuration of apparatus 800, because the laminate pairs 820 are not continuously magnetic, magneto-striction may remain desirably low, which may ensure magnetic stability of the magnetic shields 804, 806.

Accordingly, the structure and/or materials used to form the laminate pairs 820 may advantageously provide and/or serve as a portion of an abrasion-resistant magnetic shield while preserving the functional conductivity of the corresponding tape head as well as the magnetic functionality of the magnetic shields, e.g., as seen in apparatus 800. The improved tape head functionality achieved by the various embodiments described herein is advantageous, particularly in view of conventional smearing and/or scratching of the sensor structures, which has been overcome by the present embodiments. Furthermore, the improved tape head functionality achieved by the various embodiments described herein may be especially advantageous when implemented in tunnel valve structures, which may otherwise susceptible to shorting due to smearing of conductive material across the tape head.

Preferred fabrication processes for the laminate pairs 820 and/or apparatus 800 may include, e.g., sputtering, ion beam deposition, atomic layer deposition, etc. Furthermore, the laminate pairs 820 may be fabricated by full film masking a stack of the laminate pairs 820, and then milling and/or liftoff processing the resulting structure to the desired width. Depositions, e.g., of the laminate pairs 820, of the magnetic shields 804, 806, etc., may be performed sequentially in a multi-target vacuum system, with or without magnetic field enhancement. Depositions may alternatively be performed in a continuous sputtering system, e.g., for example where the sputtering occurs onto a wafer on a rotating table, etc.

The electrical lead layers 810, 812 may or may not be in electrical communication with the associated shield. In approaches where the spacer layers 814, 816 are insulative, various mechanisms for providing current to the sensor may be implemented. Looking to FIGS. 8A and 8C-8D, upper and lower electrical lead layers 810, 812 are in electrical communication with the upper and lower shields 806, 804 respectively, by implementing studs 818, 819 at a location recessed from the media facing surface 850.

Studs 818, 819 preferably include one or more conductive materials, thereby effectively providing an electrical via through insulative spacer layers 814, 816 which allows current to flow between the shields 806, 804 and electrical lead layers 810, 812, respectively. Thus, although insulative spacer layers 814, 816 may separate the shields 806, 804 from the electrical lead layers 810, 812 and sensor 808, the studs 818, 819 allow current to flow from one shield to the other through the sensor layer. According to an exemplary in-use embodiment, which is in no way intended to limit the invention, the transducer structure 802 may achieve this functionality by diverting current from lower shield 804 such that it passes through stud 819 (the stud closest thereto) and into the lower electrical lead 812. The current then travels towards the media facing surface 850 along the lower electrical lead 812, and preferably passes through the tunneling sensor layer 808 near the media facing surface 850. As will be appreciated by one skilled in the art, the strength of a signal transduced from the magnetic transitions on a magnetic recording medium decreases along the sensor in the height direction (perpendicular to the media facing side). Thus, it is preferred that at least some of the current passes through the sensor layer 808 near the media facing surface 850, e.g., to ensure high sensor output. According to one approach, this may be accomplished by achieving ideally an approximate equipotential along the length of the sensor layer 808.

Studs 818, 819 preferably have about the same thickness as upper and lower spacer layers 814, 816 respectively. Moreover, studs 818, 819 are preferably positioned behind or extend past an end of the sensor layer 808 which is farthest from the media facing surface 850.

The electrically conductive layer(s) preferably have a higher conductivity than the spacer layer. Thus, the spacer layer in some embodiments may be electrically insulating or a poor conductor. This helps ensure that a near equipotential is achieved along the length of the sensor layer. Also and/or alternatively, the resistance of the electrical lead layer along a direction orthogonal to a media facing surface may be less than a resistance across the sensor along a direction parallel to the media facing surface in some approaches. This also helps ensure that a near equipotential is achieved along the length of the sensor layer. In further approaches, the product of the spacer layer thickness multiplied by the conductivity of the spacer layer is less than a product of the electrical lead layer thickness multiplied by the conductivity of the electrical lead layer associated with the spacer layer, e.g., positioned on the same side of the sensor therewith.

Achieving near equipotential along the length of the sensor layer 808 results in an approximately equal current distribution along the length of the sensor layer 808 in the height direction. Thus, if each point along the length of the sensor layer 808 had an equal potential for an electron to tunnel therethrough, the distribution of current would be about equal as well along the length of the sensor layer 808. Moreover, insulating layer 822 which may include any one or more of the materials described herein, desirably ensures that current does not flow around (circumvent) the sensor layer 808. Although equipotential is preferred along the length of the sensor layer 808, a 20% or less difference in the voltage drop (or loss) across the sensor layer 808 at the media facing surface 850 compared to the voltage drop across the end of the sensor layer 808 farthest from the media facing surface 850 may be acceptable, e.g., depending on the desired embodiment. For example, a voltage drop of 1 V across the sensor layer 808 at the media facing surface 850 compared to a voltage drop of 0.8 V across the end of the sensor layer 808 farthest from the media facing surface 850 may be acceptable.

Although the operating voltage may be adjusted in some approaches to compensate for differences in the voltage drop along the length of the sensor layer 808 of greater than about 10%, it should be noted that the operating voltage is preferably not increased to a value above a threshold value. In other words, increasing the operating voltage above a threshold value is preferably not used to bolster the voltage drop across the sensor layer 808 at the media facing surface 850 to a desired level (e.g., sensitivity) when a transducer structure 802 has a drop of greater than about 10%. The threshold value for the operating voltage of a given approach may be predetermined, calculated in real time, be set in response to a request, etc. According to an exemplary approach, the threshold value for the operating voltage may be determined using the breakdown voltage(s) of the transducer structure 802 layers, e.g., based on their material composition, dimensions, etc.

In some embodiments, differences in resistivity may also be used to minimize the voltage drop along the length of the sensor layer 808. In order to ensure that sufficient current passes through the sensor layer 808 near the media facing surface 850, it is preferred that the resistivity of the sensor layer 808, as for example due to tunnel barrier resistivity in a TMR, is high relative to the resistivity of the electrical lead layers 810, 812. By creating a difference in the relative resistance of the adjacent layers, low voltage drop may desirably be achieved along the height of the sensor layer 808.

This relative difference in resistivity values may be achieved by forming the sensor layer 808 such that it has a relatively high barrier resistivity, while the electrical lead layers 810, 812 may have a higher thickness, thereby resulting in a lower resistance value. However, it should be noted that the thickness of the electrical lead layers 810, 812 is preferably greater than about 2 nm. The bulk resistivity of a given material typically increases as the dimensions of the material decreases. As will be appreciated by one skilled in the art upon reading the present description, the resistivity of a material having significantly small dimensions may actually be higher than for the same material having larger dimensions, e.g., due to electron surface scattering. Moreover, as the thickness of the electrical lead layers 810, 812 decreases, the resistance thereof increases. Accordingly, the thickness of the upper and/or lower electrical lead layers 810, 812 is preferably between about 2 nm and about 20 nm, more preferably between about 5 nm and about 15 nm, still more preferably less than about 15 nm, but may be higher or lower depending on the desired embodiment, e.g., depending on the material composition of the upper and/or lower electrical lead layers 810, 812. Moreover, the thicknesses (in the deposition direction) of the upper and/or lower spacer layers 814, 816 are preferably between about 5 nm and about 50 nm, but may be higher or lower depending on the desired embodiment. For example, spacer layers having a relatively hard material composition may be thinner than spacer layers having a material composition which is less hard.

With continued reference to FIG. 8A, studs 818, 819 may be implemented during formation of the transducer structure 802, using processes which would be apparent to one skilled in the art upon reading the present description. According to an example, which is in no way intended to limit the invention, the spacer layer may be formed over a mask (e.g., using sputtering or other forms of deposition), thereby creating a void in the spacer layer upon removal of the mask. Thereafter, the stud may be formed in the void, e.g., using sputtering or plating, after which the stud may be planarized. However, according to another example, a spacer layer may be formed full film, after which a via may be created, e.g., using masking and milling, and filling the via with the stud material, e.g., using ALD, after which the stud may optionally be planarized. Moreover, it should be noted that insulating layer 822 may be thicker than sensor 808, thereby causing upper electrical lead layer 810 and upper spacer layer 814 to extend in the intended tape travel direction 852 before continuing beyond the edge of the sensor 808 farthest from the media facing surface 850, e.g., as a result of manufacturing limitations, as would be appreciated by one skilled in the art upon reading the present description.

Thus, the spacer layers 814, 816 in combination with the studs 818, 819 may provide protection against smearing at the media facing surface 850 while also allowing for the shields 806, 804 to be in electrical communication with the electrical lead layers 810, 812. It follows that one or both of the shields 806, 804 may serve as electrical connections for the transducer structure 802. According to the present embodiment, the shields 806, 804 function as the leads for the transducer structure 802. Moreover, the current which flows towards the media facing surface 850 tends to generate a magnetic field which is canceled out by the magnetic field created by the current which flows away from the media facing surface 850.

However, it should be noted that the embodiment illustrated in FIG. 8A is in no way intended to limit the invention. Although the electrical lead layers 810, 812 depicted in FIG. 8A are electrically connected to upper and lower shields 806, 804 respectively, in other embodiments, one or both of the electrical lead layers 810, 812 may not be electrically connected to the respective shields. According to one example, the upper and lower electrical lead layers may be stitched leads, e.g., see FIGS. 10A-10C and FIGS. 11A-11C, rather than each of the lead layers 810, 812 having a single lead as seen in FIG. 8A, as will soon become apparent. Thus, neither of the upper or lower electrical lead layers may be in electrical communication with the shields according to some embodiments, as will be described in further detail below.

Figure 9A:
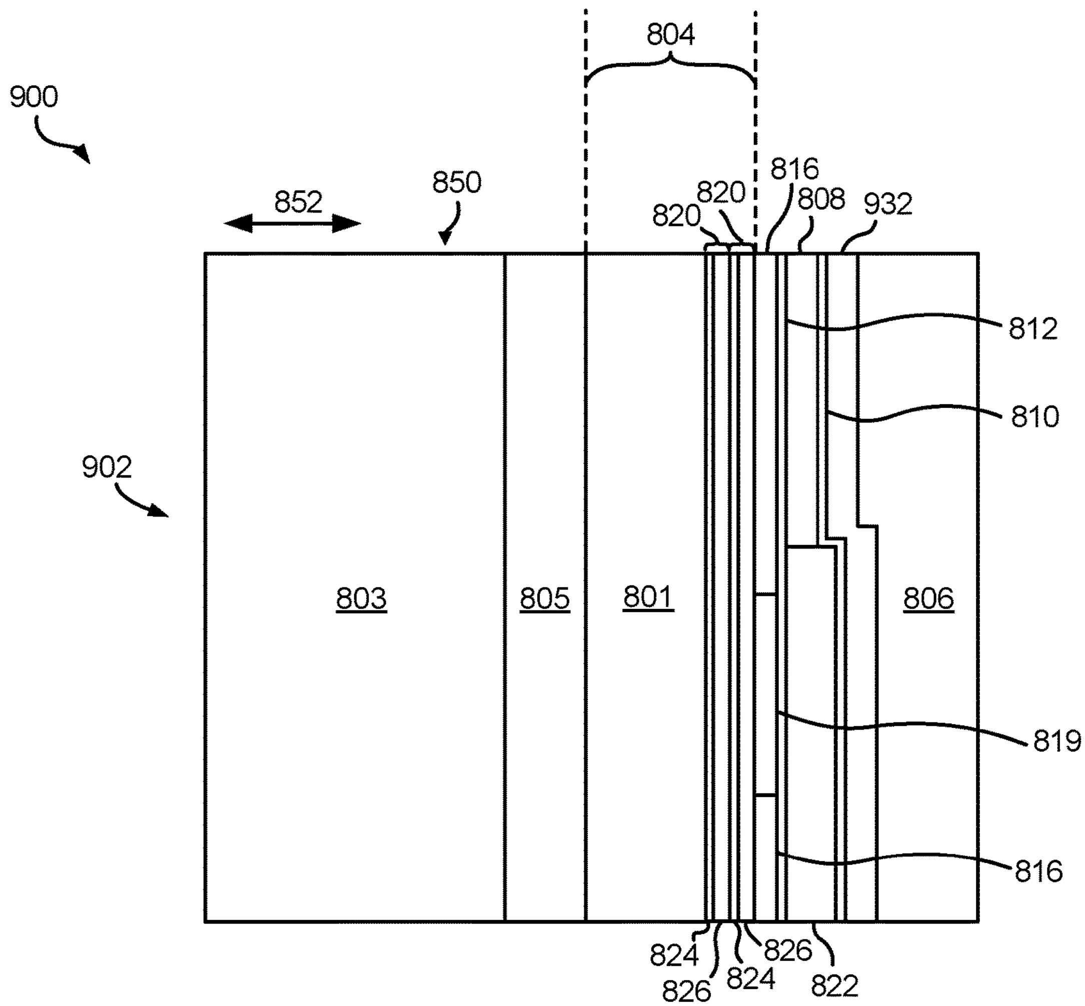
FIGS. 9A-9C are partial cross-sectional views of a media facing side of a transducer structure according to various embodiments.

FIG. 9A depicts an apparatus, in accordance with one embodiment. As an option, the present apparatus 900 may be implemented in conjunction with features from any other embodiment listed herein, such as those described with reference to the other FIGS. However, such apparatus 900 and others presented herein may be used in various applications and/or in permutations which may or may not be specifically described in the illustrative embodiments listed herein. Further, the apparatus 900 presented herein may be used in any desired environment. Thus FIG. 9A (and the other FIGS.) may be deemed to include any possible permutation.

According to one embodiment of apparatus 900 depicted in FIG. 9A, only a single hard spacer layer 816 is present. In this embodiment, the hard spacer layer 816 is between the sensor 808 and the lower shield 804. A conductive conventional spacer layer 932 is present between the sensor 808 and the upper shield 806.

The lower shield 804 has at least one laminate pair 820, and preferably two laminate pairs 820 as shown, that includes a magnetically permeable layer 826 and a harder layer 824, where the harder layer 824 may have a mechanical hardness higher than a mechanical hardness of the magnetically permeable layer 826 as described in detail previously for FIG. 8A. In some approaches, the lower magnetic shield 804 further includes a non-laminated magnetic portion 801 sandwiching the at least one laminate pair 820 between the non-laminated magnetic portion 801 and the sensor 808.

Figure 9B:
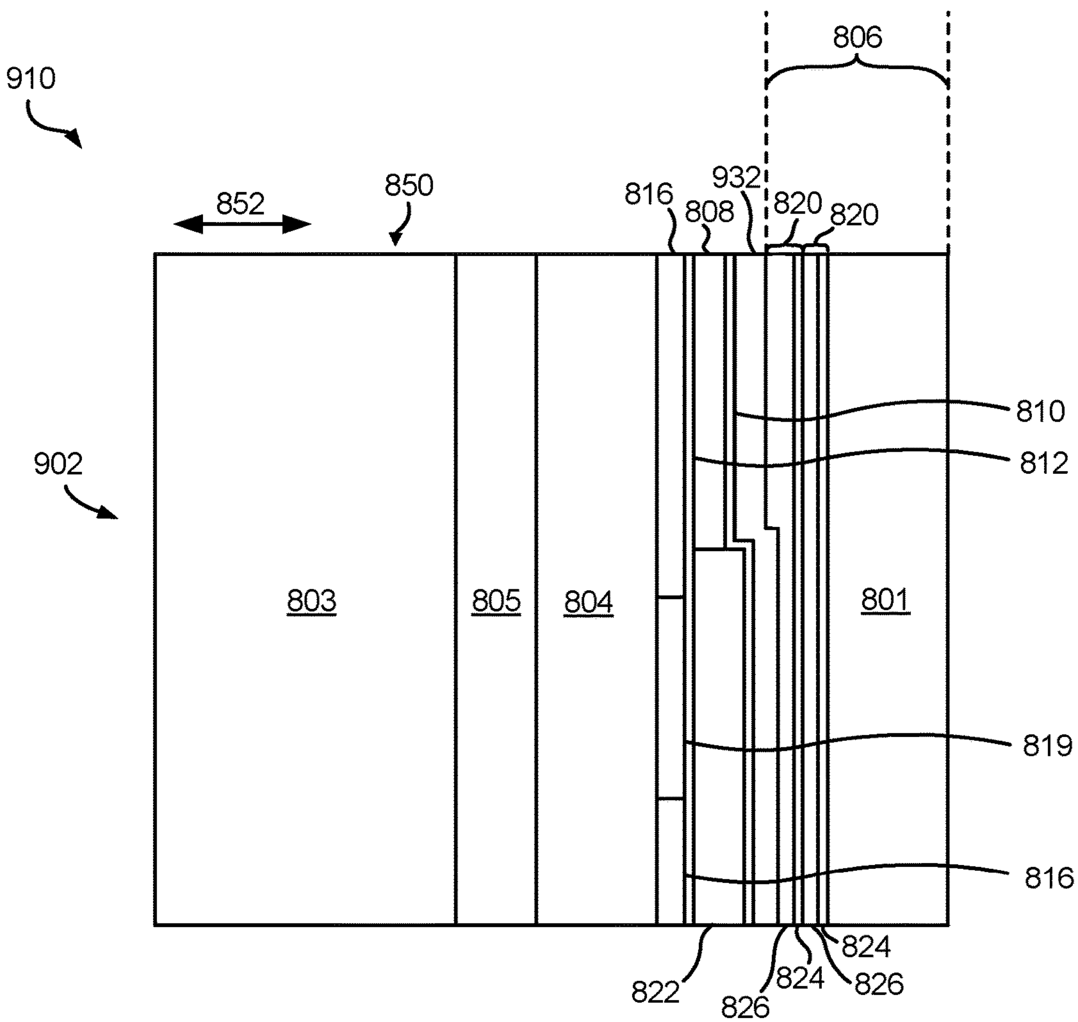

According to one embodiment of apparatus 910, as illustrated in FIG. 9B, a single hard spacer layer 816 is between the sensor 808 and the lower shield 804. A conductive conventional spacer layer 932 is present between the sensor 808 and the upper shield 806 that has at least one laminate pair 820, preferably two laminate pairs, in which each laminate pair 820 has a magnetically permeable layer 826 and a harder layer 824. The magnetic shield 806 further includes a non-laminated magnetic portion 801 sandwiching the at least one laminate pair 820 between the non-laminated magnetic portion 801 and the sensor 808.

Figure 9C:
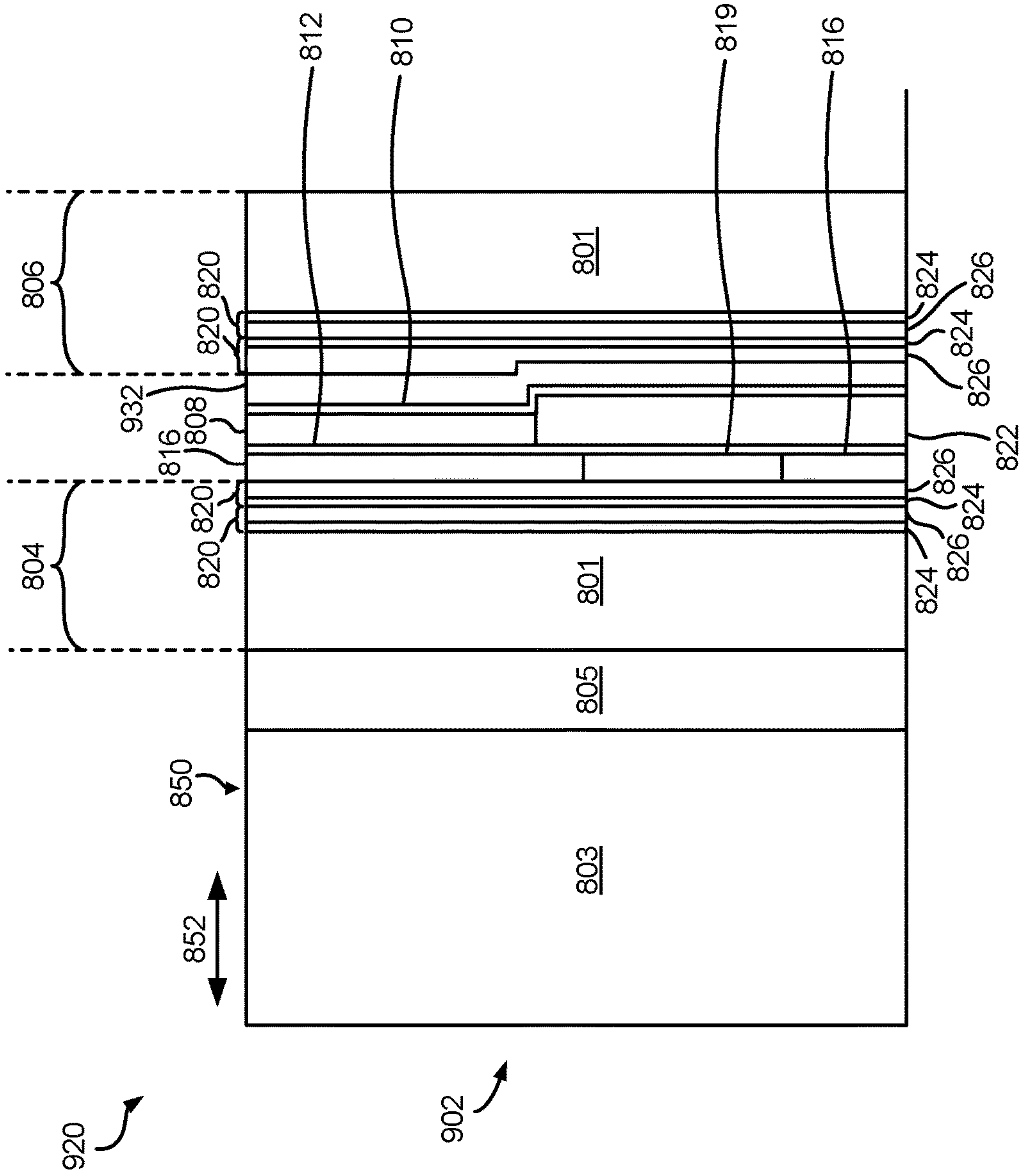

In one embodiment of apparatus 920 as shown in FIG. 9C, a single hard spacer layer 816 is between the sensor 808 and the lower shield 804, in which the lower shield 804 has a non-laminated magnetic portion 801 and a laminate portion that includes at least two laminate pairs 820. A conductive conventional spacer layer 932 is positioned between the sensor 808 and the upper shield 806 of which the upper shield 806 has a non-laminated magnetic portion 801 and a laminate portion that includes at least two laminate pairs 820. Each laminate pair 820 of the magnetic shields 804, 806 includes a magnetically permeable layer 826 paired with harder layer 824

Figure 10A:
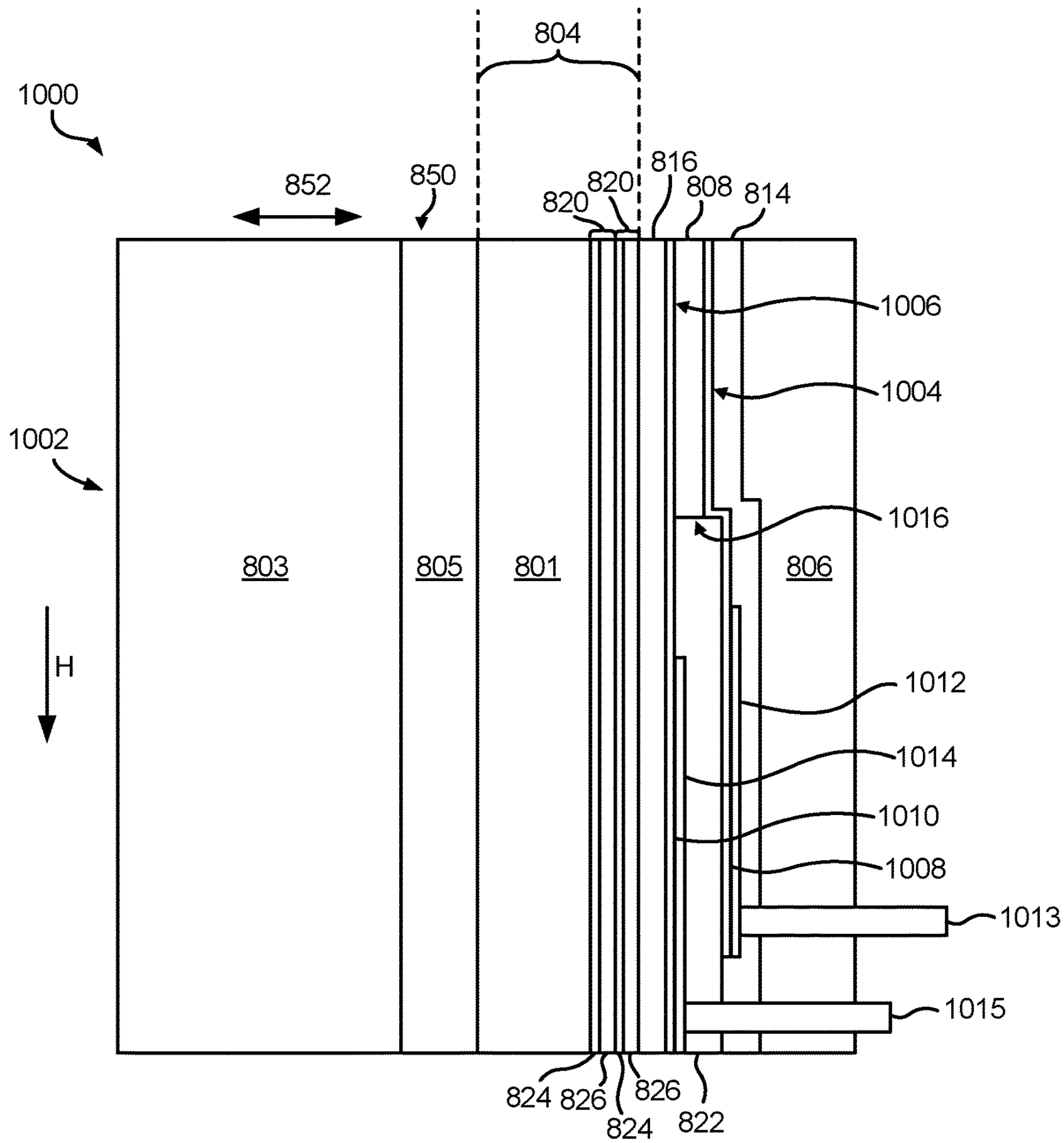
FIGS. 10A-10C are partial cross-sectional views of a media facing side of a transducer structure according to various embodiments.

Looking to FIG. 10A, an apparatus 1000 depicts a transducer structure 1002 in accordance with various embodiments. As an option, the present apparatus 1000 may be implemented in conjunction with features from any other embodiment listed herein, such as those described with reference to the other FIGS. Specifically, for example, FIG. 10A illustrates variations of the embodiment of FIG. 8A depicting several exemplary configurations within the transducer structure 1002. Accordingly, various components of FIG. 10A have common numbering with those of FIG. 8A.

However, such apparatus 1000 and others (e.g. 1020 and 1030) presented herein may be used in various applications and/or in permutations which may or may not be specifically described in the illustrative embodiments listed herein. Further, the apparatus 1000 presented herein may be used in any desired environment. Thus FIG. 10A (and the other FIGS.) may be deemed to include any possible permutation.

Looking to FIG. 10A, apparatus 1000 includes a transducer structure 1002 having spacer layers 814, 816 sandwiched between shields 806, 804 and electrical lead layers 1004, 1006 respectively. However, unlike the embodiment illustrated in FIG. 8A, upper and lower electrical lead layers 1004, 1006 of the present embodiment may not be in electrical communication with either of the shields 806, 804. Rather, when the spacer layers 814, 816 are insulating and fully isolate electrical lead layers 1004, 1006 from upper and lower shields 806, 804 respectfully along the lengths (perpendicular to the media facing surface 850) thereof. Thus, a current (e.g., a read sense current) does not pass through at least one of the upper and lower shields from the CPP sensor 808 and/or electrical lead layers 1004, 1006. In other words, the electrical connection to one or both of the electrical lead layers 1004, 1006 may be independent. As mentioned above, upper and/or lower spacer layers 814, 816 may include at least one of ruthenium, aluminum oxide, chrome oxide, silicon nitride, boron nitride, silicon carbide, silicon oxide, titanium oxide, an amorphous aluminum oxide, etc., and/or combinations thereof, and conducting but non-smearing materials such as titanium nitride, conductive ceramics, etc.

According to some approaches, the at least one of the upper and lower shields 806, 804 not having a current (e.g., a read sense current) passing therethrough may be coupled to a bias voltage source. In other words, at least one of the upper and lower shields 806, 804 may be coupled to a bias voltage source. According to other approaches, one or both of the shields may be coupled to an electrical connection (e.g., a lead), but may not carry any current therethrough.

In one embodiment of apparatus 1000, the lower shield 804 has at least one laminate pair 820, and preferably two laminate pairs 820 as shown, in which each laminate pair 820 has a magnetically permeable layer 826 and a harder layer 824 as described in detail previously for FIG. 8A. The magnetic shield 804 further includes a non-laminated magnetic portion 801 sandwiching the at least one laminate pair 820 between the non-laminated magnetic portion 801 and the sensor 808.

As mentioned above, at least one of the upper and lower electrical lead layers may be a stitched lead. According to the present embodiment, which is in no way intended to limit the invention, both electrical lead layers 1004, 1006 are stitched leads which include a main layer 1008, 1010 and a preferably thicker stitch layer 1012, 1014 thereon, respectively. Vias 1013, 1015 may be coupled to a respective electrical lead layer 1004, 1006. The main layers 1008, 1010 may be made during formation of the transducer structure 1002, while stitch layers 1012, 1014 may be drilled and backfilled after formation of the transducer structure 1002 using processes and/or in a direction which would be apparent to one skilled in the art upon reading the present description.

As shown, the stitch layers 1012, 1014 are preferably recessed from a media facing side of the main layer 1008, 1010, e.g., the side closes to the media facing surface 850. By stitching a second layer of lead material, e.g. the stitch layer 1012, 1014, which is preferably recessed beyond a back edge 1016 of the sensor 808 in the height direction H, the resistance associated with the electrical lead layers 1004, 1006 may desirably be reduced, e.g., relative to routing either of the leads past a back edge of the respective shield. In various embodiments, the main layers 1008, 1010 and/or a stitch layers 1012, 1014 of either of the stitched electrical lead layers 1004, 1006 may be constructed of any suitable conductive material, e.g., which may include Ir, Cu, Ru, Pt, NiCr, Au, Ag, Ta, Cr, etc.; a laminated structure of Ta (e.g. Ta/X/Ta); etc.

As mentioned above, the stitched electrical lead layer configuration implemented in transducer structure 1002 desirably reduces the resistance associated with the routing either of the leads beyond a back edge of the respective shield. For example, in an embodiment where Ru is used as the top lead material, the resistivity "ρ" would be about 7.1 micro-ohms/cm. A single lead with thickness of 30 nm would have a sheet resistivity (ρ/thickness) equal to about 2.3 ohms/square. This implies that if the top lead design had 6 "squares" of lead geometry, the lead resistance would be about 13.8 ohms. However, by implementing a stitched layer above the main layer of the stitched electrical lead layer, the total lead resistance would be significantly reduced. For example, consider a stitched lead of Ru with a thickness of 45 nm covering 5 of the 6 "squares" of the lead geometry. The lead region where the stitched structure and the initial lead overlay has a net thickness of about 75 nm and a sheet resistivity equal to 0.95 ohms/square. Implementing a stitched electrical lead layer as described above would reduce the lead resistance to 7.3 ohms or by about 45%. Embodiments described herein may or may not implement the stitched electrical lead layers 1004, 1006 (e.g., see FIG. 8A), depending on the preferred embodiment.

In still further approaches, one or more of the electrical lead layers may be an extension of a layer itself, or a separately-deposited material. Establishing an electrical connection to a magnetic lamination proximate to the sensor may create a configuration in which portions of the magnetic shields of an apparatus are not biased or current-carrying. In such embodiments, the electrical lead layers included between the sensor structure and the magnetic shield may serve as an electrical lead. Moreover, at least one of the upper and lower shields 806, 804 may be a floating shield, and thereby may not be biased or current-carrying.

Figure 10B:
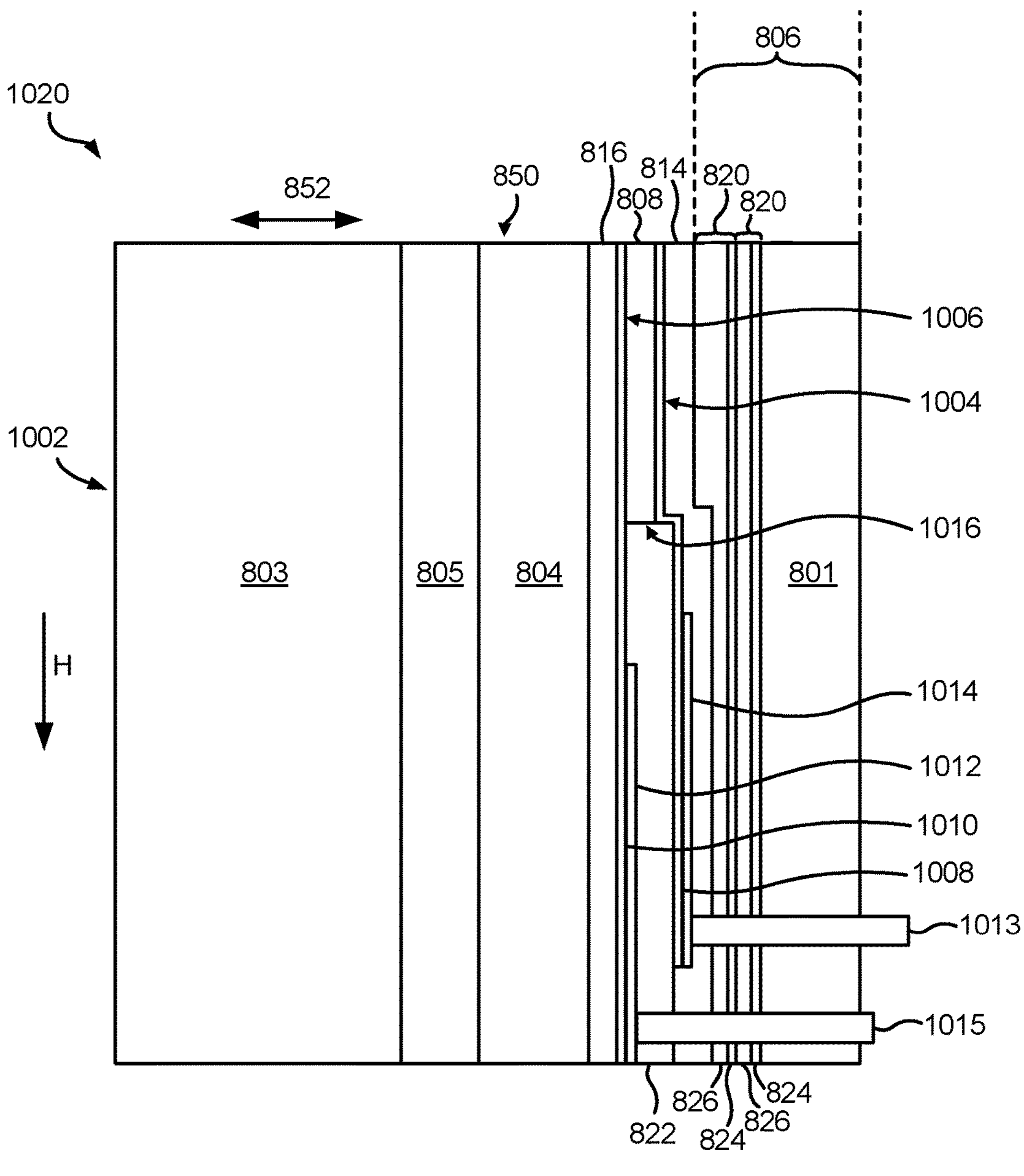

According to one embodiment of apparatus 1020 in FIG. 10B, the transducer structure 1002 has spacer layers 814, 816 sandwiched between shields 806, 804 and electrical lead layers 1004, 1006, respectively, where the upper shield 806 includes a non-laminate portion 801 sandwiching the at least one laminate pair 820 of the upper shield 806, and preferably two laminate pairs 820 as shown, between the non-laminated magnetic portion 801 of the upper shield 806 and the sensor 808. Moreover the electrical lead layers 1004, 1006 may not be in electrical communication with either of the shields 806, 804 as described for apparatus 1000 in FIG. 10A.

Figure 10C:
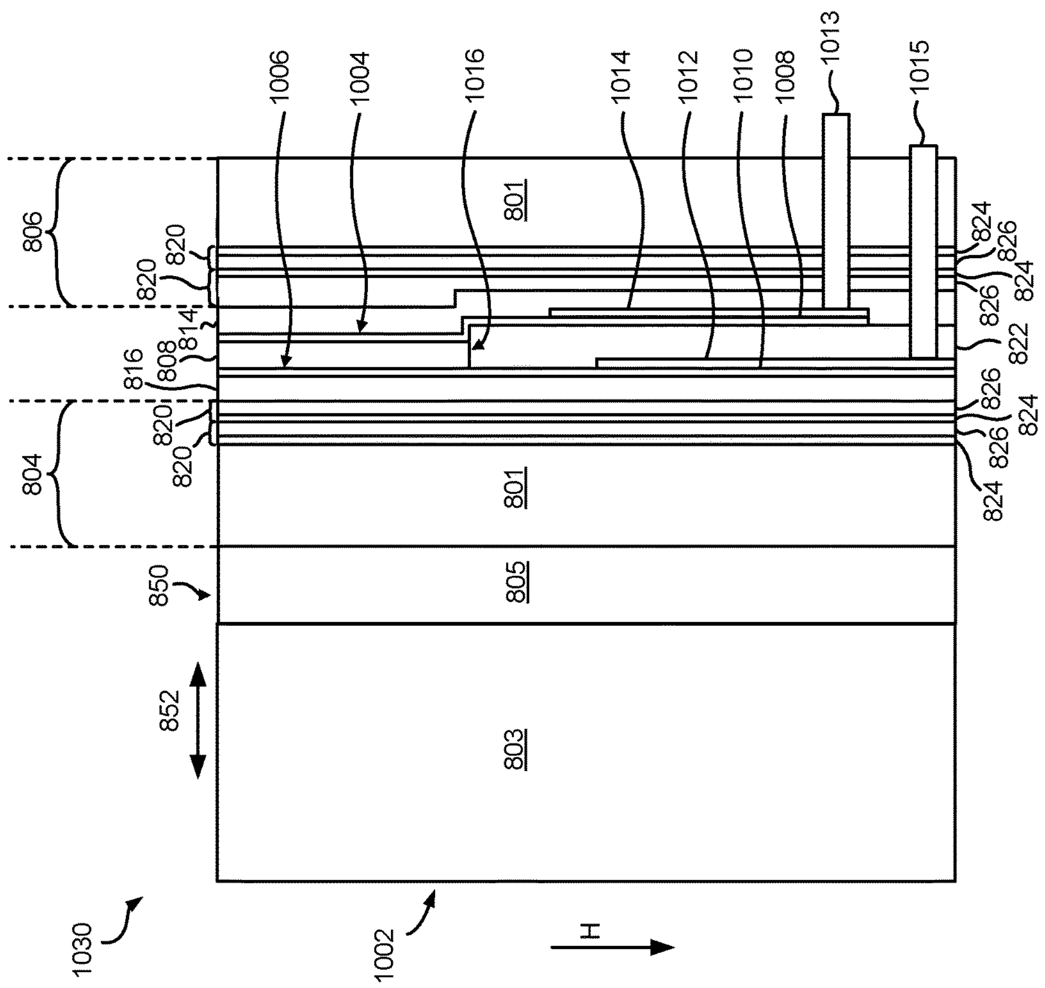

According to one embodiment of apparatus 1030 in FIG. 10C, the transducer structure 1002 has spacer layers 814, 816 sandwiched between shields 806, 804 and electrical lead layers 1004, 1006, respectively, where both the upper and lower shields 806, 804 include a non-laminate portion 801 sandwiching the at least one laminate pair 820 of the shields 806, 804, and preferably two laminate pairs 820 as shown, between the non-laminated magnetic portion 801 of the shields 806, 804 and the sensor 808. Moreover the electrical lead layers 1004, 1006 may not be in electrical communication with either of the shields 806, 804 as described for apparatus 1000 in FIG. 10A.

Figure 11A:
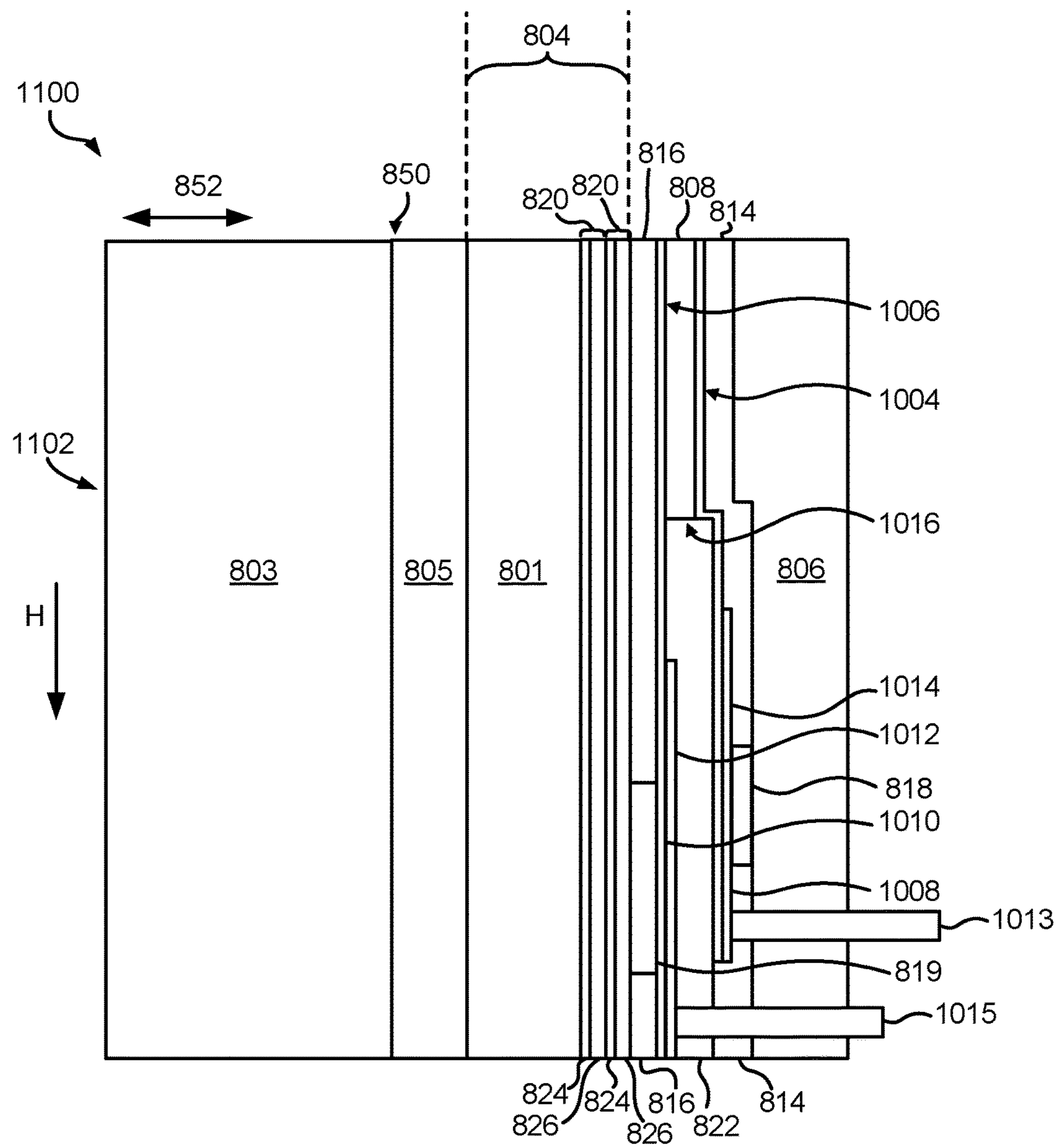
FIGS. 11A-11C are partial cross-sectional views of a media facing side of a transducer structure according to various embodiments.

Looking to FIG. 11A, an apparatus 1100 depicts a transducer structure 1102 in accordance with various embodiments. As an option, the present apparatus 1100 may be implemented in conjunction with features from any other embodiment listed herein, such as those described with reference to the other FIGS. Specifically, for example, FIG. 11A illustrates variations of the embodiment of FIG. 8A depicting several exemplary configurations within the transducer structure 1002. Accordingly, various components of FIG. 11A have common numbering with those of FIG. 8A.

However, such apparatus 1100 and others (e.g. 1120 and 1130) presented herein may be used in various applications and/or in permutations which may or may not be specifically described in the illustrative embodiments listed herein. Further, the apparatus 1100 presented herein may be used in any desired environment. Thus FIG. 11A (and the other FIGS.) may be deemed to include any possible permutation.

FIG. 11A depicts an apparatus 1100 which include vias 1013, 1015 like those of FIGS. 10A-10C, and studs 818, 819 like those in FIG. 8A. The studs 818, 819 are not current carrying and therefore preferably have a relatively high resistance compared to the current-carrying portions of the head.

Moreover, in one embodiments of the apparatus 1100, the lower shield 804 has at least one laminate pair 820, and preferably two laminate pairs 820 as shown, with each laminate pair 820 having a magnetically permeable layer 826 and a harder layer 824 as described in more detail for apparatus 800 in FIG. 8A. The magnetic shield 804 includes a non-laminated magnetic portion 801 sandwiching the at least one laminate pair 820 between the non-laminated magnetic portion 801 and the sensor 808.

According to an exemplary in-use embodiment, which is in no way intended to limit the invention, the transducer structure 1102 may achieve this functionality by diverting current from lower shield 804 such that it passes through stud 819 (the stud closest thereto, as described in FIG. 8A) and into the via 1015 coupled to the lower electrical lead layer 1006 (e.g. as described in FIG. 10A). The current then travels towards the media facing surface 850 along the lower electrical lead 1006, and preferably passes through the tunneling sensor layer 808 near the media facing surface 850. As will be appreciated by one skilled in the art, the strength of a signal transduced from the magnetic transitions on a magnetic recording medium decreases along the sensor in the height direction (perpendicular to the media facing side). Thus, it is preferred that at least some of the current passes through the sensor layer 808 near the media facing surface 850, e.g., to ensure high sensor output. According to one approach, this may be accomplished by achieving ideally an approximate equipotential along the length of the sensor layer 808.

Figure 11B:
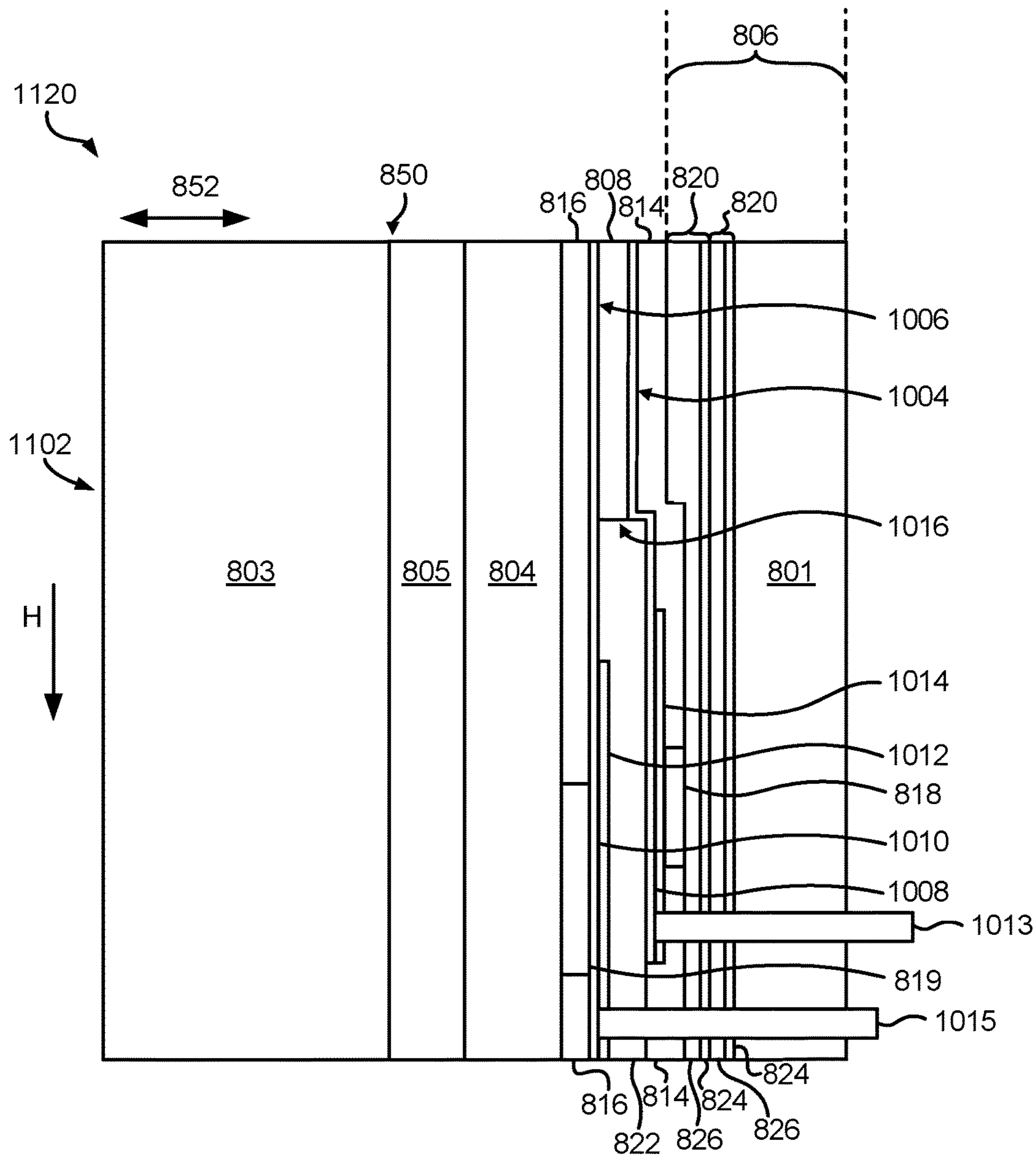

According to one embodiment of apparatus 1120 in FIG. 11B, the transducer structure 1002 includes vias 1013, 1015 like those of FIGS. 10A-10C, and studs 818, 819 that are not current carrying and therefore preferably have a relatively high resistance compared to the current-carrying portions of the head (e.g. as described in FIG. 11A). Moreover, the apparatus 1120 includes an upper shield 806 having a non-laminate portion 801 sandwiching the at least one laminate pair 820 of the upper shield 806 between the non-laminated magnetic portion 801 of the upper shield 806 and the sensor 808. Each laminate pair 820 of the upper shield 806 includes a magnetically permeable layer 826 and a harder layer 824.

Figure 11C:
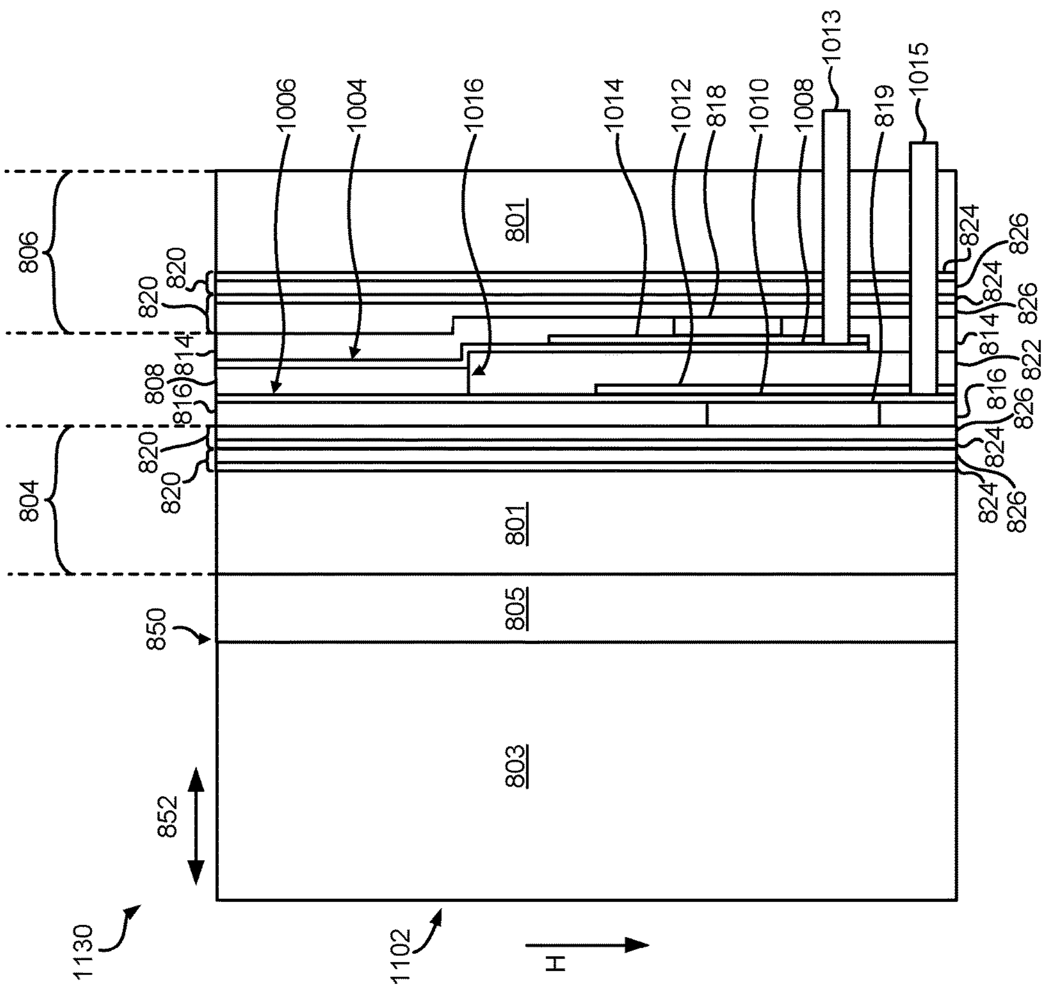

According to one embodiment of apparatus 1130 in FIG. 11C, the transducer structure 1002 includes vias 1013, 1015 like those of FIGS. 10A-10C, and studs 818, 819 that are not current carrying and therefore preferably have a relatively high resistance compared to the current-carrying portions of the head (e.g. as described in FIG. 11A). Moreover, the apparatus 1120 includes both an upper shield 806 and lower shield 804 having a non-laminate portion 801 sandwiching the at least one laminate pair 820, preferably two laminate pairs 820 as shown, of the shields 804, 806 between the non-laminated magnetic portion 801 of the respective shields 804, 806 and the sensor 808. Each laminate pair 820 of the upper shield 806 and lower shield 804 includes a magnetically permeable layer 826 and a harder layer 824.

Various embodiments described herein are able to provide bi-directional protection for CPP transducers against shorting which may otherwise result from passing magnetic media over such transducers. Implementing a spacer layer having a high resistivity to smearing and/or plowing between the CPP transducer layer and each of the conducting lead portions of the transducer stack without hindering the flow of current through the sensor enables the embodiments herein to maintain desirable performance over time. Moreover, as previously mentioned, although it is preferred that an spacer layer is included on either side of a sensor along the intended direction of tape travel, some of the embodiments described herein may only include one spacer layer positioned between one of the leads or sensor and the shield closest thereto, such that the at least one lead is electrically isolated from the shield closest thereto.

Various embodiments may be fabricated using known manufacturing techniques. Conventional materials may be used for the various layers unless otherwise specifically foreclosed. Furthermore, as described above, deposition thicknesses, configurations, etc. may vary depending on the embodiment.

It should be noted that although FIGS. 8-9 each illustrate a single transducer structure (transducer structures 802, 902, 1002, 1102), various embodiments described herein include at least eight of the transducer structures above a common substrate, e.g., as shown in FIG. 2B. Furthermore, the number of transducer structures in a given array may vary depending on the preferred embodiment.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:

a transducer structure having:

a lower shield;

an upper shield above the lower shield, the upper and lower shields providing magnetic shielding;

a current-perpendicular-to-plane sensor between the upper and lower shields;

an electrical lead layer between the sensor and one of the shields, wherein the electrical lead layer is in electrical communication with the sensor;

wherein a resistance of the electrical lead layer along a direction orthogonal to a media facing surface is less than a resistance across the sensor along a direction parallel to the media facing surface; and a spacer layer between the electrical lead layer and the one of the shields, wherein at least one of the shields has at least one laminate pair comprising a magnetically permeable layer and a harder layer, wherein the harder layer has a mechanical hardness that is higher than a mechanical hardness of the magnetically permeable layer.

2. An apparatus as recited in claim 1, wherein a thickness of the electrical lead layer is greater than 2 nanometers.

3. An apparatus as recited in claim 1, wherein the electrical lead layer is a first electrical lead layer and is present between the sensor and the upper shield, wherein a second electrical lead layer is present between the sensor and the lower shield, wherein the spacer layer is present between the upper shield and the first electrical lead layer, wherein a second spacer layer is present between the lower shield and the second electrical lead layer.

4. An apparatus as recited in claim 1, wherein the spacer layer includes at least one of: ruthenium, aluminum oxide, chrome oxide, silicon nitride, boron nitride, silicon carbide, silicon oxide, titanium oxide, and titanium nitride.

5. An apparatus as recited in claim 4, wherein the spacer layer includes amorphous aluminum oxide.

6. An apparatus as recited in claim 4, wherein the spacer layer includes at least partially polycrystalline aluminum oxide.

7. An apparatus as recited in claim 1, wherein the electrical lead layer includes a main layer and a stitch layer thereon, the stitch layer being recessed from a media facing side of the main layer.

8. An apparatus as recited in claim 1, wherein the spacer layer is electrically conductive.

9. An apparatus as recited in claim 1, wherein the spacer layer is electrically insulating.

10. An apparatus as recited in claim 1, wherein the electrical lead layer is in electrical communication with the one of the shields.

11. An apparatus as recited in claim 1, wherein the electrical lead layer is not in electrical communication with the one of the shields.

12. An apparatus as recited in claim 1, wherein the sensor is a tunneling magnetoresistive sensor.

13. An apparatus as recited in claim 1, wherein the harder layer in the laminate pair comprises a material selected from a group consisting of iron nitride, iridium, aluminum oxide, silicon oxide, silicon nitride, titanium oxide, and magnesium oxide.

14. An apparatus as recited in claim 1, wherein at least one of the shields has at least two of the laminate pairs.

15. An apparatus as recited in claim 1, wherein at least one of the magnetic shields further includes a non-laminated magnetic portion sandwiching the at least one laminate pair between the non-laminated magnetic portion and the sensor.

16. An apparatus as recited in claim 1, wherein a deposition thickness of the harder layer in each laminate pair is between about 1 nanometer and about 20 nanometers.

17. An apparatus as recited in claim 1, wherein a deposition thickness of the harder layer in each laminate pair is about 20% or less of a total deposition thickness of the laminate pair.

18. An apparatus as recited in claim 1, comprising a second nonmagnetic spacer between the sensor and the upper shield, the upper shield having at least one laminate pair comprising a second magnetically permeable layer and a second harder layer, wherein the second harder layer has a mechanical hardness that is higher than a mechanical hardness of the second magnetically permeable layer.

19. An apparatus as recited in claim 1, comprising:

a drive mechanism for passing a magnetic medium over the sensor; and a controller electrically coupled to the sensor.

* * * * *